United States Patent
Mertens et al.

(10) Patent No.: US 12,428,106 B2
(45) Date of Patent: Sep. 30, 2025

(54) SNOWMOBILE

(71) Applicant: Polaris Industries Inc., Medina, MN (US)

(72) Inventors: Dustin A. Mertens, Roseau, MN (US); Martin E. Sampson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/608,200

(22) Filed: Mar. 18, 2024

(65) Prior Publication Data

US 2024/0217622 A1 Jul. 4, 2024

Related U.S. Application Data

(60) Continuation of application No. 16/047,676, filed on Jul. 27, 2018, now abandoned, which is a continuation of application No. 13/798,105, filed on Mar. 13, 2013, now Pat. No. 10,035,554, which is a division of application No. 13/021,586, filed on Feb. 4, 2011, now Pat. No. 9,446,810.

(60) Provisional application No. 61/337,676, filed on Feb. 9, 2010, provisional application No. 61/302,394, filed on Feb. 8, 2010.

(51) Int. Cl.
*B62M 27/02* (2006.01)
*B60R 13/08* (2006.01)
*B62J 25/06* (2020.01)

(52) U.S. Cl.
CPC .............. *B62M 27/02* (2013.01); *B62J 25/06* (2020.02); *Y10T 403/70* (2015.01)

(58) Field of Classification Search
CPC ............ B62M 27/02; B62M 2027/023; B62M 2027/028; B60R 13/08; B60R 2013/0807; B60R 13/0838; B60R 13/0876; B62D 55/07; B60Y 2200/252
USPC ....................................... 180/190; 296/193.11
See application file for complete search history.

(56) References Cited

U.S. PATENT DOCUMENTS

| | | | |
|---|---|---|---|
| 601,453 | A | 3/1898 | Watson et al. |
| 1,315,360 | A | 9/1919 | Blystad |
| 1,387,131 | A | 8/1921 | Dean |
| 1,650,334 | A | 11/1927 | Eliason |
| 3,575,474 | A | 4/1971 | Russ, Sr. |
| 3,713,669 | A | 1/1973 | Evans |
| 3,722,961 | A | 3/1973 | Haley et al. |

(Continued)

FOREIGN PATENT DOCUMENTS

| | | |
|---|---|---|
| CA | 2109241 A1 | 2/1995 |
| CA | 2189156 A1 | 4/1998 |

(Continued)

OTHER PUBLICATIONS

"2009 Arctic Cat CFR1000 Orange (S2009CFLRCUSO) Tunnel, Rear Bumper, And Taillight Assembly", Internet, date consulted Apr. 11, 2023, available at https://www.arcticcatpartshouse.com/oemparts/a/arc/507ff5e2f870022698363af0/tunnel-rear-bumper-and-taillight-assembly; 5 pages.

(Continued)

*Primary Examiner* — Anne Marie M Boehler
(74) *Attorney, Agent, or Firm* — Merchant & Gould P.C.

(57) ABSTRACT

The present invention generally relates to snowmobiles. More particularly, the present invention relates to the components of a snowmobile such as the frame, running boards and various other assemblies.

27 Claims, 22 Drawing Sheets

(56) References Cited

U.S. PATENT DOCUMENTS

| | | | |
|---|---|---|---|
| 3,732,939 A | 5/1973 | Samson | |
| 3,743,343 A | 7/1973 | Grote et al. | |
| 3,773,127 A * | 11/1973 | Aaen | B62M 27/02 181/205 |
| 3,779,327 A * | 12/1973 | Perreault | B62M 27/02 180/190 |
| 3,781,067 A | 12/1973 | Masters et al. | |
| 3,835,948 A | 9/1974 | Duclo | |
| 3,840,082 A | 10/1974 | Olson | |
| 3,840,083 A | 10/1974 | Woods | |
| 3,870,337 A | 3/1975 | Gilles et al. | |
| 3,901,335 A | 8/1975 | Johnson | |
| 3,966,004 A | 6/1976 | Rose | |
| 4,022,378 A | 5/1977 | Essiembre | |
| 4,146,101 A | 3/1979 | Plourde | |
| 4,491,333 A | 1/1985 | Warnke | |
| 4,610,326 A * | 9/1986 | Kirchweger | B60R 13/0884 181/204 |
| 5,129,473 A | 7/1992 | Boyer | |
| 5,152,365 A * | 10/1992 | Aoshima | F02M 35/162 180/68.2 |
| 5,474,146 A | 12/1995 | Yoshioka et al. | |
| 5,533,585 A | 7/1996 | Kawano et al. | |
| 5,550,338 A * | 8/1996 | Hielscher | G10K 11/168 181/290 |
| 5,568,840 A | 10/1996 | Nagata et al. | |
| 5,685,387 A | 11/1997 | Rioux et al. | |
| 5,700,020 A | 12/1997 | Noble | |
| 5,881,834 A | 3/1999 | Karpik | |
| 5,957,230 A | 9/1999 | Harano et al. | |
| 5,996,717 A | 12/1999 | Hisadomi | |
| 6,012,728 A | 1/2000 | Noble | |
| 6,109,217 A | 8/2000 | Hedlund et al. | |
| 6,302,466 B1 * | 10/2001 | Zwick | B60R 13/08 52/396.08 |
| 6,331,008 B2 | 12/2001 | Cormican | |
| 6,431,561 B1 | 8/2002 | Hedlund | |
| 6,446,744 B2 | 9/2002 | Wubbolts et al. | |
| 6,510,913 B1 | 1/2003 | Morin et al. | |
| 6,604,594 B2 | 8/2003 | Wubbolts et al. | |
| 6,626,444 B2 | 9/2003 | Noble | |
| 6,681,724 B1 | 1/2004 | Berg | |
| 6,708,791 B2 | 3/2004 | Alexander | |
| 6,749,036 B1 | 6/2004 | Schrapp et al. | |
| 6,755,271 B1 | 6/2004 | Berg | |
| 6,758,497 B2 | 7/2004 | Bergman | |
| 6,772,852 B2 | 8/2004 | Morin et al. | |
| 6,808,034 B2 * | 10/2004 | Nakano | B62M 27/02 123/65 PE |
| 6,851,717 B1 | 2/2005 | Andersen | |
| 6,863,142 B2 | 3/2005 | Corbeil | |
| 6,892,844 B2 | 5/2005 | Atsuumi | |
| 6,942,052 B1 * | 9/2005 | Blakely | B62M 29/00 180/190 |
| 6,973,988 B2 | 12/2005 | Morin et al. | |
| RE39,012 E | 3/2006 | Noble | |
| 7,040,438 B2 | 5/2006 | Yoshihara | |
| 7,048,293 B2 | 5/2006 | Bedard | |
| 7,055,454 B1 | 6/2006 | Whiting et al. | |
| 7,080,706 B2 | 7/2006 | Vaisanen | |
| 7,124,848 B2 | 10/2006 | Girouard et al. | |
| 7,150,336 B2 | 12/2006 | Desmarais | |
| 7,188,693 B2 | 3/2007 | Girouard et al. | |
| 7,204,331 B2 | 4/2007 | Yatagai et al. | |
| 7,232,134 B2 | 6/2007 | Ruzewski et al. | |
| 7,252,301 B2 | 8/2007 | Vaelikangas | |
| 7,316,284 B2 | 1/2008 | Lefort | |
| 7,322,435 B2 | 1/2008 | Lillbacka et al. | |
| 7,328,765 B2 | 2/2008 | Ebert et al. | |
| 7,353,898 B1 | 4/2008 | Bates, Jr. | |
| 7,357,201 B2 | 4/2008 | Jordan | |
| 7,377,348 B2 | 5/2008 | Girouard et al. | |
| 7,413,046 B2 | 8/2008 | Okada et al. | |
| 7,445,084 B2 * | 11/2008 | Berbner | G10K 11/162 181/290 |
| 7,487,975 B2 | 2/2009 | Pryputniewicz | |
| 7,503,568 B2 | 3/2009 | Mehrmann | |
| 7,533,749 B1 | 5/2009 | Sampson et al. | |
| 7,559,580 B2 | 7/2009 | Araujo | |
| 7,617,900 B2 | 11/2009 | Olson | |
| 7,775,313 B1 | 8/2010 | Sampson et al. | |
| 7,779,944 B2 | 8/2010 | Bergman et al. | |
| 7,802,644 B2 | 9/2010 | Brodeur et al. | |
| 7,870,920 B1 | 1/2011 | Dahlgren et al. | |
| 7,997,372 B2 | 8/2011 | Maltais | |
| 8,122,993 B2 | 2/2012 | Ripley et al. | |
| 8,567,545 B1 | 10/2013 | Anderson | |
| 9,446,810 B2 | 9/2016 | Ripley | |
| 10,035,554 B2 | 7/2018 | Mertens et al. | |
| 2002/0129984 A1 | 9/2002 | Wubbolts et al. | |
| 2003/0029663 A1 * | 2/2003 | Etou | B62M 27/02 180/312 |
| 2003/0137117 A1 | 7/2003 | Lund et al. | |
| 2004/0104062 A1 | 6/2004 | Bedard et al. | |
| 2004/0173390 A1 | 9/2004 | Karpik | |
| 2005/0034909 A1 | 2/2005 | Vaisanen | |
| 2005/0039961 A1 | 2/2005 | Moriyama | |
| 2005/0039962 A1 | 2/2005 | Bedard | |
| 2005/0126839 A1 | 6/2005 | Rasidescu et al. | |
| 2006/0061051 A1 | 3/2006 | Lemieux | |
| 2006/0162976 A1 | 7/2006 | Desmarais | |
| 2007/0284171 A1 | 12/2007 | Okada et al. | |
| 2009/0071738 A1 | 3/2009 | Bennett | |
| 2010/0089355 A1 | 4/2010 | Fredrickson et al. | |
| 2010/0108427 A1 * | 5/2010 | Richer | B62M 27/02 180/190 |
| 2010/0140007 A1 | 6/2010 | Ogura et al. | |
| 2011/0049858 A1 | 3/2011 | Surti | |
| 2011/0132679 A1 | 6/2011 | Kerner et al. | |
| 2018/0334211 A1 | 11/2018 | Mertens et al. | |

FOREIGN PATENT DOCUMENTS

| | | |
|---|---|---|
| CA | 2244520 A1 | 1/2000 |
| CA | 2451017 A1 | 5/2004 |
| CA | 2714434 A1 | 9/2009 |
| CA | 2788551 A1 | 8/2011 |
| CA | 2790442 A1 | 3/2013 |
| FR | 2662610 A1 | 12/1991 |
| GB | 2200879 A | 8/1988 |
| WO | 2008/060265 A2 | 5/2008 |
| WO | 2009/114414 A1 | 9/2009 |

OTHER PUBLICATIONS

CA2, 189, 156 to Allard, translation (Year: 1998).
European Patent Office, International Search Report for PCT/US2010/003207, May 6, 2011, 8 pages.
European Patent Office, Written Opinion for PCT/US2010/003207, May 6, 2011, 12 pages.
International Preliminary Report on Patentability received for PCT Patent Application No. PCT/US2010/003207, mailed on May 24, 2012, 37 pages.
Office Action issued by the Canadian Intellectual Property Office, dated Apr. 20, 2017, for related Canadian Patent Application No. 2,788,551; 4 pages.
Office Action issued by the Canadian Intellectual Property Office, dated Apr. 11, 2023, for Canadian Patent Application No. 3,092,403; 9 pages.
Office Action issued by the Canadian Intellectual Property Office, dated Feb. 24, 2022, for Canadian Patent Application No. 3,092,403; 5 pages.
Second Office Action issued by the Canadian Intellectual Property Office, dated Jan. 11, 2018, for related Canadian Patent Application No. 2,788,551; 5 pages.

* cited by examiner

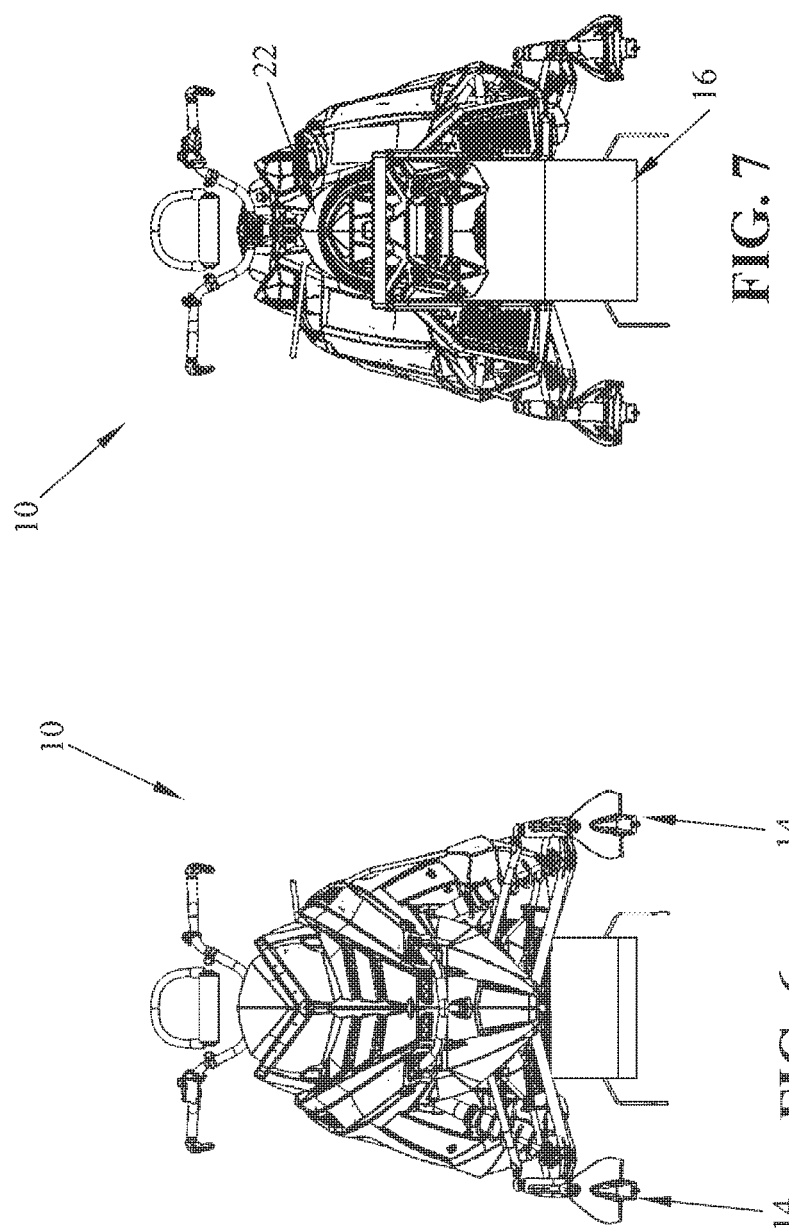

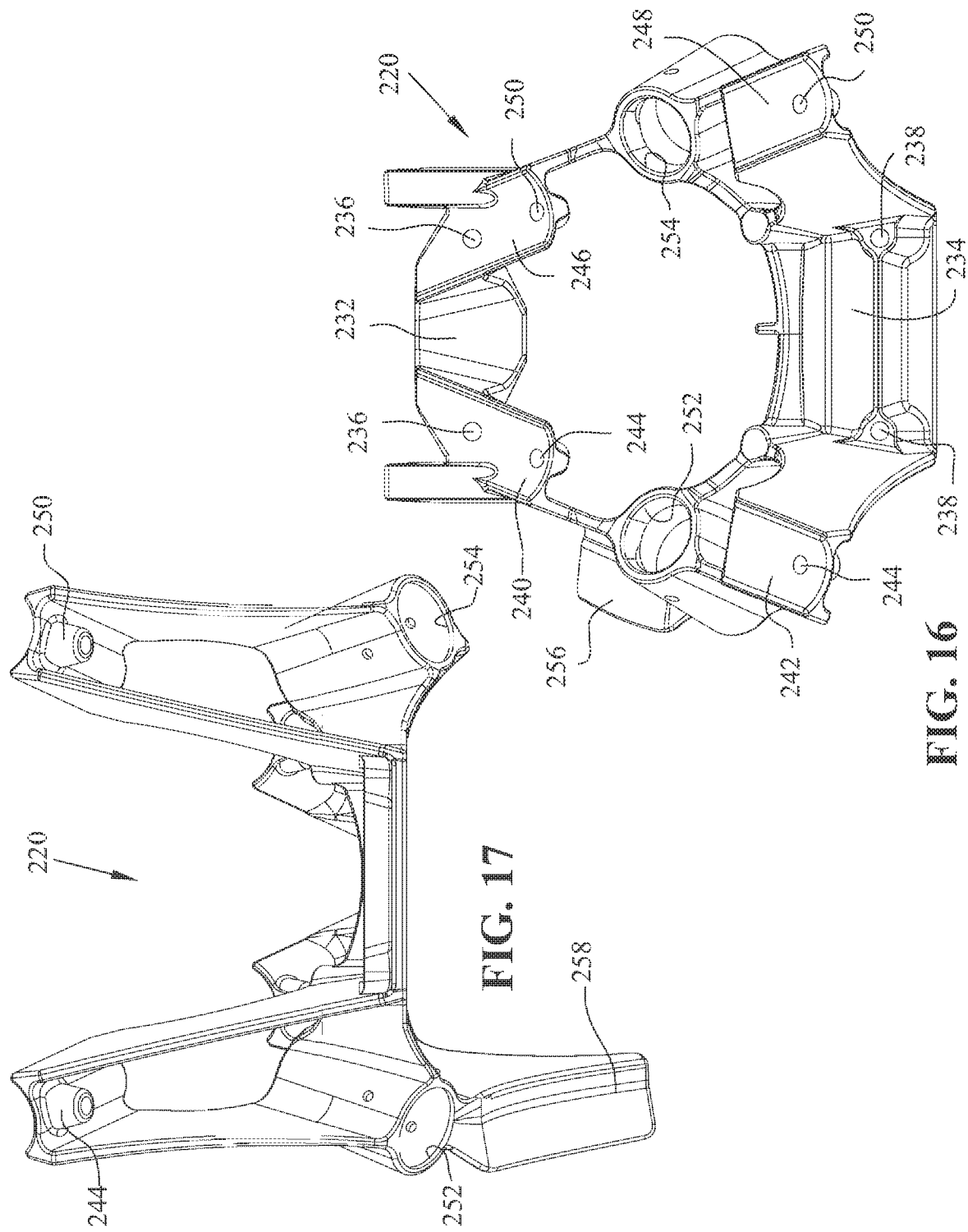

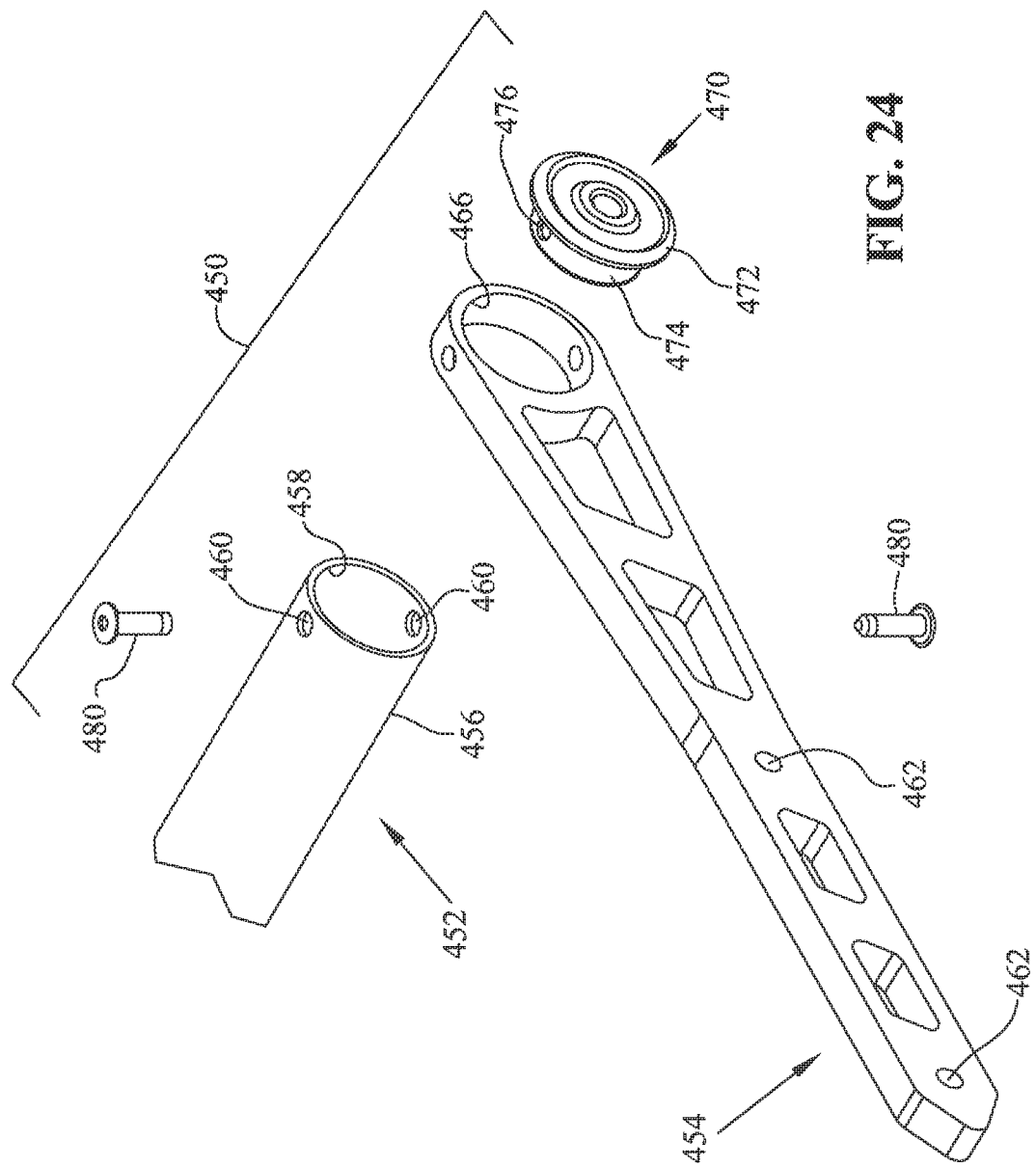

SNOWMOBILE

CROSS-REFERENCE TO RELATED APPLICATIONS

This application is a continuation of U.S. application Ser. No. 16/047,676, filed Jul. 27, 2018, which is a continuation of U.S. application Ser. No. 13/798,105, filed on Mar. 13, 2013, which is a divisional of U.S. application Ser. No. 13/021,586, filed Feb. 4, 2011, which claims the benefit of U.S. Provisional Patent Application Ser. No. 61/302,394, filed on Feb. 8, 2010, and U.S. Provisional Patent Application Ser. No. 61/337,676, filed on Feb. 9, 2010, the complete disclosures of which are expressly incorporated by reference herein.

BACKGROUND

The present invention generally relates to snowmobiles. More particularly, the present invention relates to the components of a snowmobile such as the frame, suspension, running boards and various other assemblies.

Generally, there are a variety of configurations of snowmobiles available for applications such as deep snow, high performance, luxury touring, trail riding, etc. Most snowmobiles include a frame, a power train, a pair of front skis, and an endless belt assembly. Typically, features such as engine displacement and track length vary depending upon the specific application for which the snowmobile is targeted. For example, snowmobiles designed primarily for deep snow application may include an endless belt assembly having a longer track length, i.e. 166 inches (4.2 meters), than a snowmobile designed primarily for trail riding, i.e. 135 inches (3.4 meters). A snowmobile designed for deep snow may also include a relatively large displacement engine, i.e. 900 cc (54.9 inches$^3$), to provide suitable power when operating in a mountain environment at higher elevations with less oxygen. Other features of a deep snow snowmobile may be added to improve ride and handling characteristics, such as side hilling.

A deep snow snowmobile is shown in our U.S. patent application Ser. No. 11/501,454, filed Aug. 9, 2006, the complete disclosure of which is expressly incorporated by reference herein.

SUMMARY

One illustrative embodiment of the present invention includes a snowmobile comprising a frame; a power train supported by the frame; a running board assembly supported by the frame and comprising a toe clip, a front wall and a foot tread; and a shroud laterally encompassing the toe clip and the back wall, with the toe clip extending rearwardly, beyond a rear edge of the shroud.

Another illustrative embodiment of the present invention includes a foot grip assembly comprising a frame; a power train supported by the frame; a running board assembly supported by the frame and comprising a toe clip, a front wall and a foot tread; and a shroud laterally encompassing the toe clip and the back wall, with the back wall extending substantially aligned with a rear edge of the shroud.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 6 is a front view of the embodiment shown in FIG. 1;

FIG. 7 is a rear view of the embodiment shown in FIG. 1;

FIG. 16 is a front perspective of a cast frame member of the front frame of the snowmobile of FIG. 15;

FIG. 17 is an underside perspective view of the cast frame member of FIG. 16;

FIG. 24 shows an exploded view of a rear bumper of the snowmobile of FIG. 1.

DETAILED DESCRIPTION OF THE DRAWINGS

Figure 1:
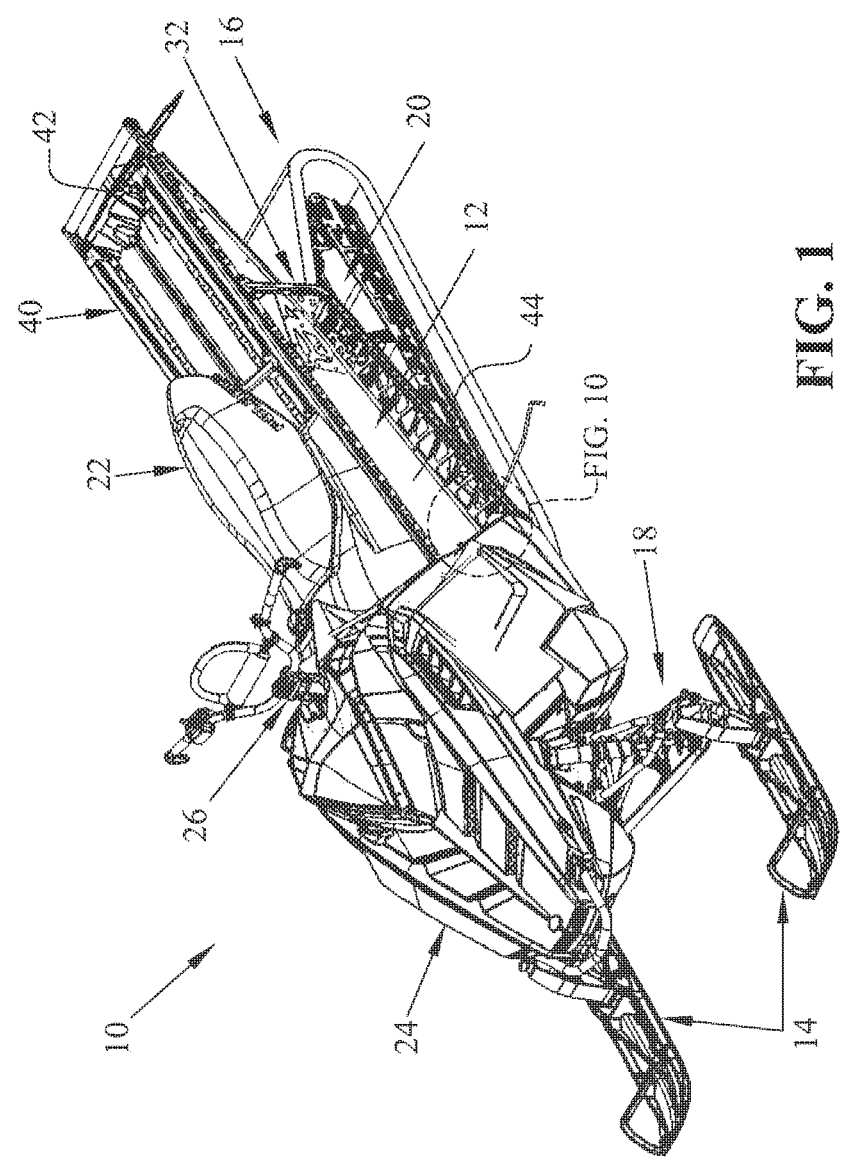
FIG. 1 is a front perspective view of an illustrative embodiment of a snowmobile.

Corresponding reference characters indicate corresponding parts throughout the several views. Although the drawings represent embodiments of the present invention, the drawings are not necessarily to scale and certain features may be exaggerated in order to better illustrate and explain the present invention.

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds.

Referring to FIGS. 1-8, one illustrative embodiment of a snowmobile 10 is shown. Snowmobile 10 includes a frame 12, supported by front skis 14 and an endless belt assembly 16. Front skis 14 are coupled to a front suspension 18, and endless belt assembly 16 is supported by a rear suspension 20. Snowmobile 10 also includes a seat assembly 22, front outer body 24, and a steering assembly 26. Steering assembly 26 is operably coupled to steering arms 28 (FIG. 2) which allows a rider to steer snowmobile 10. A power train is covered by outer body 24 and provides power to endless belt assembly 16. Running board assemblies 32 extend along the sides of the seat assembly 22 and are supported by the frame 12. A snow flap 34 (FIG. 2) is also supported by the frame 12 rearward of endless belt 16.

Figure 2:
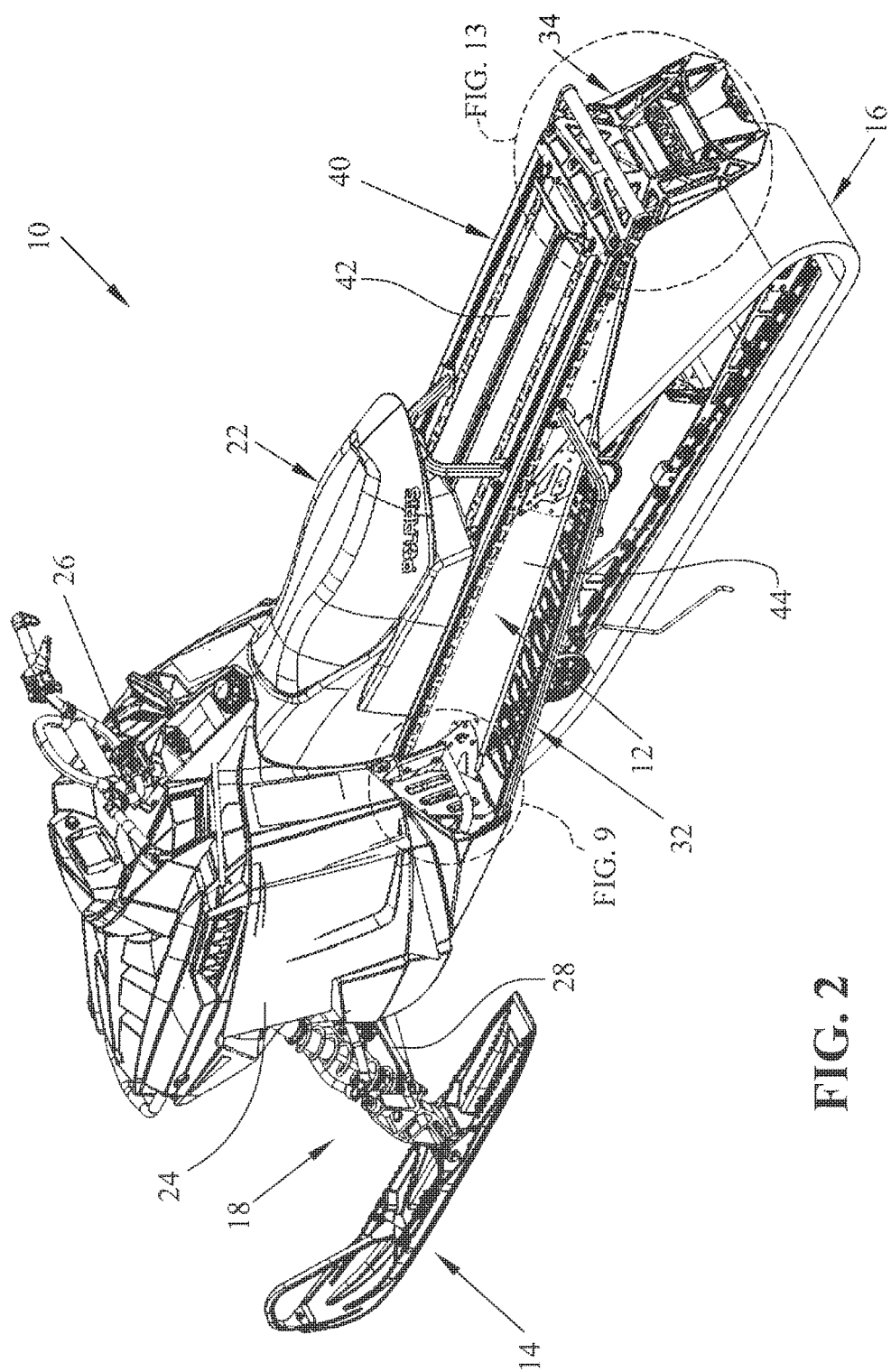
FIG. 2 is a rear perspective view of the embodiment shown in FIG. 1.
Figure 3:
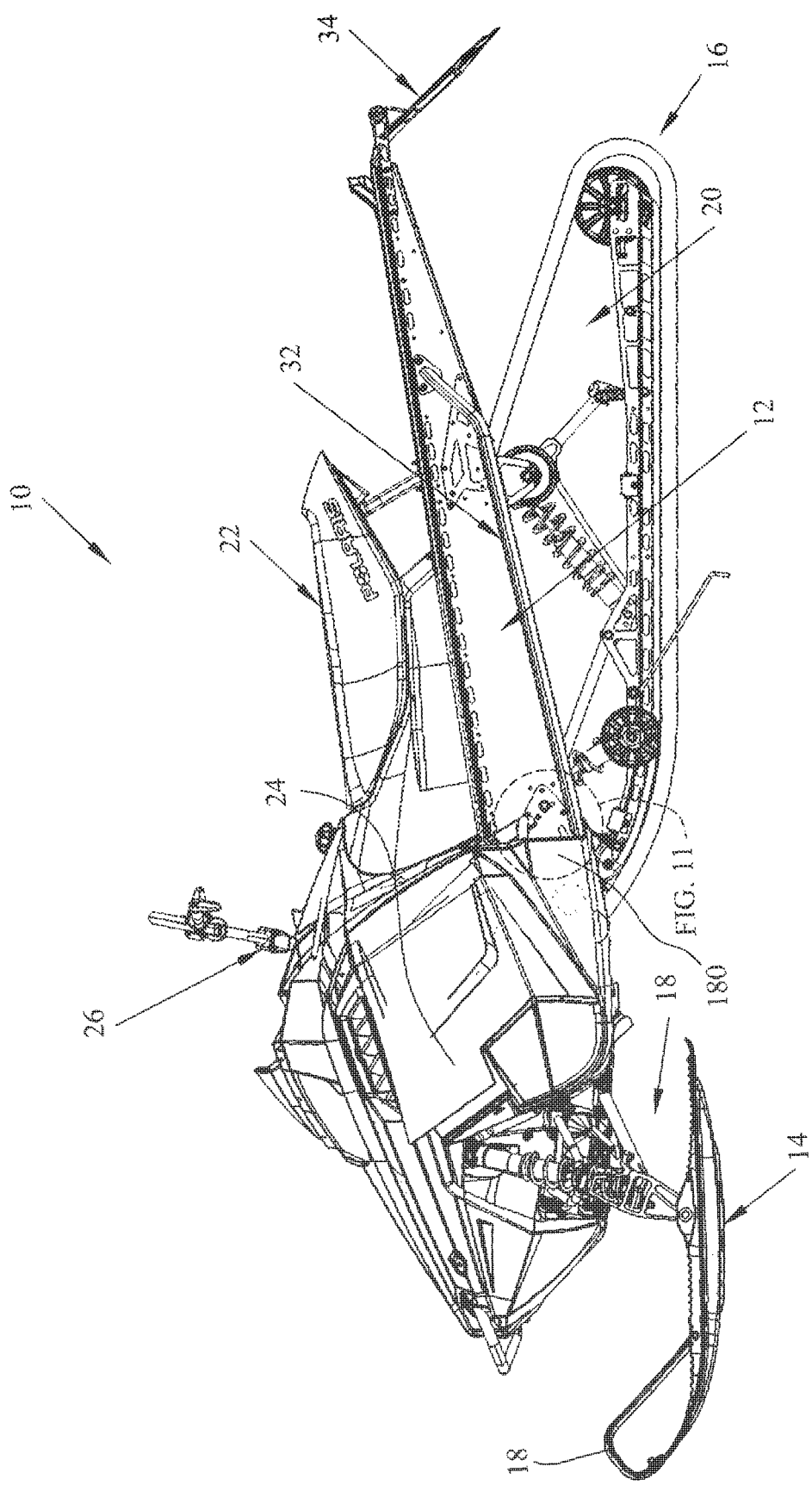
FIG. 3 is a side view of the left hand side of the embodiment shown in FIG. 1.
Figure 4:
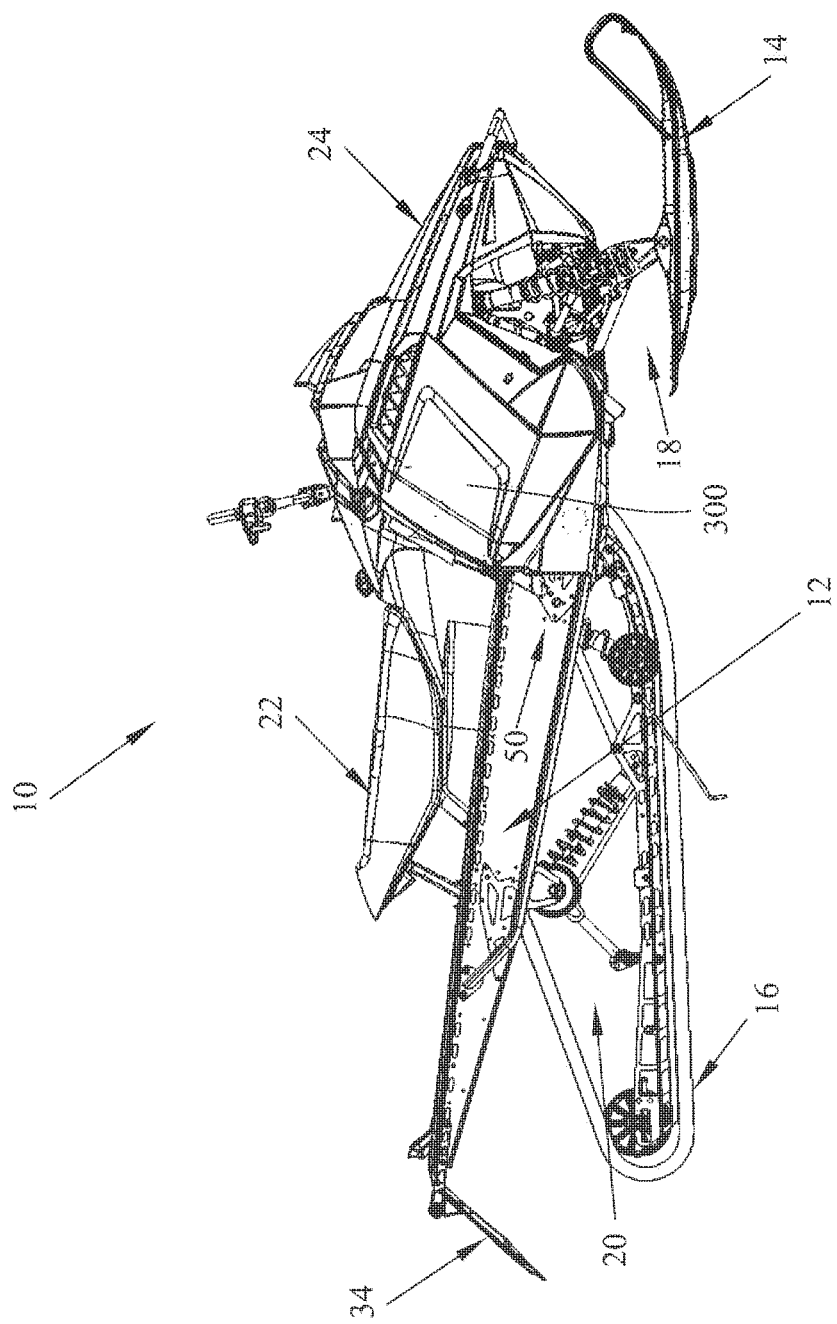
FIG. 4 is a side view of the right side of the embodiment shown in FIG. 1.
Figure 5:
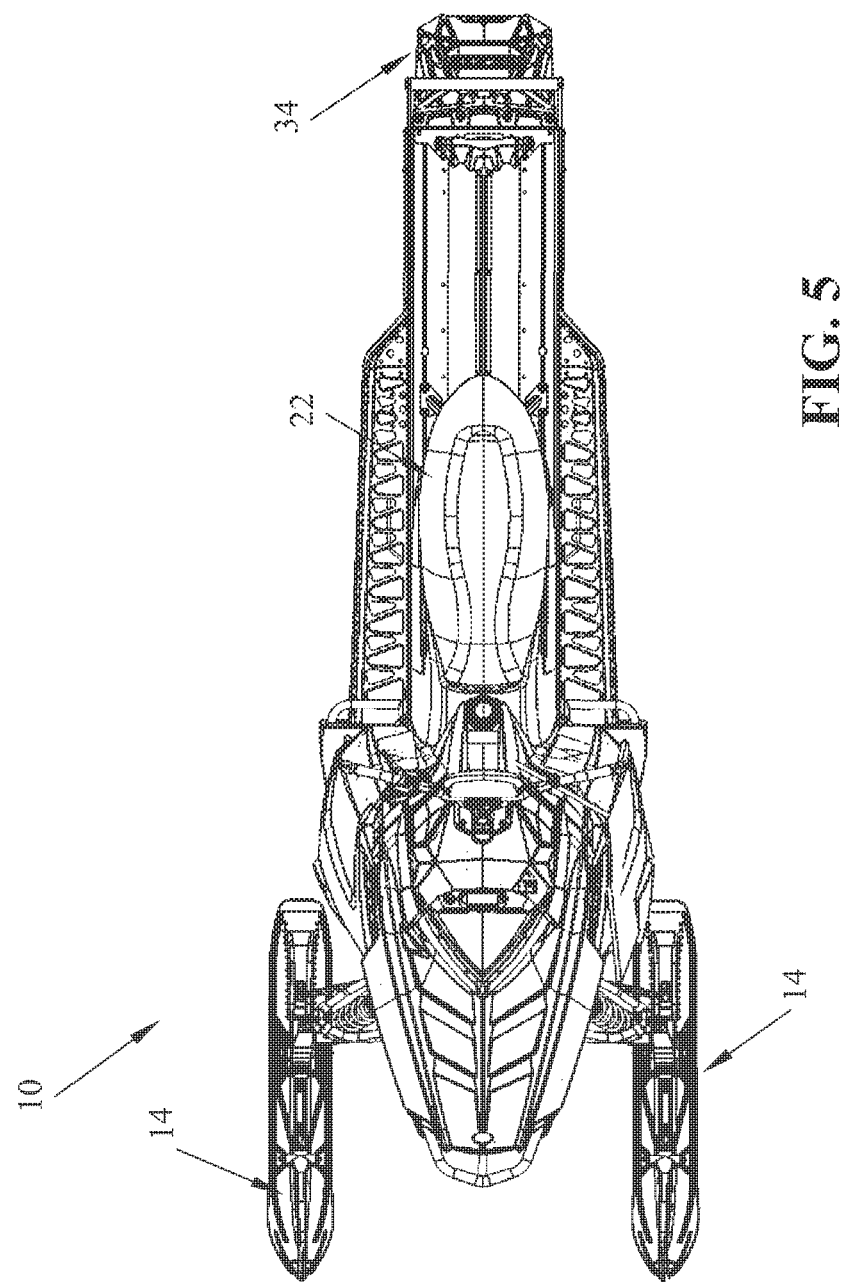
FIG. 5 is a top view of the embodiment shown in FIG. 1.
Figure 8:
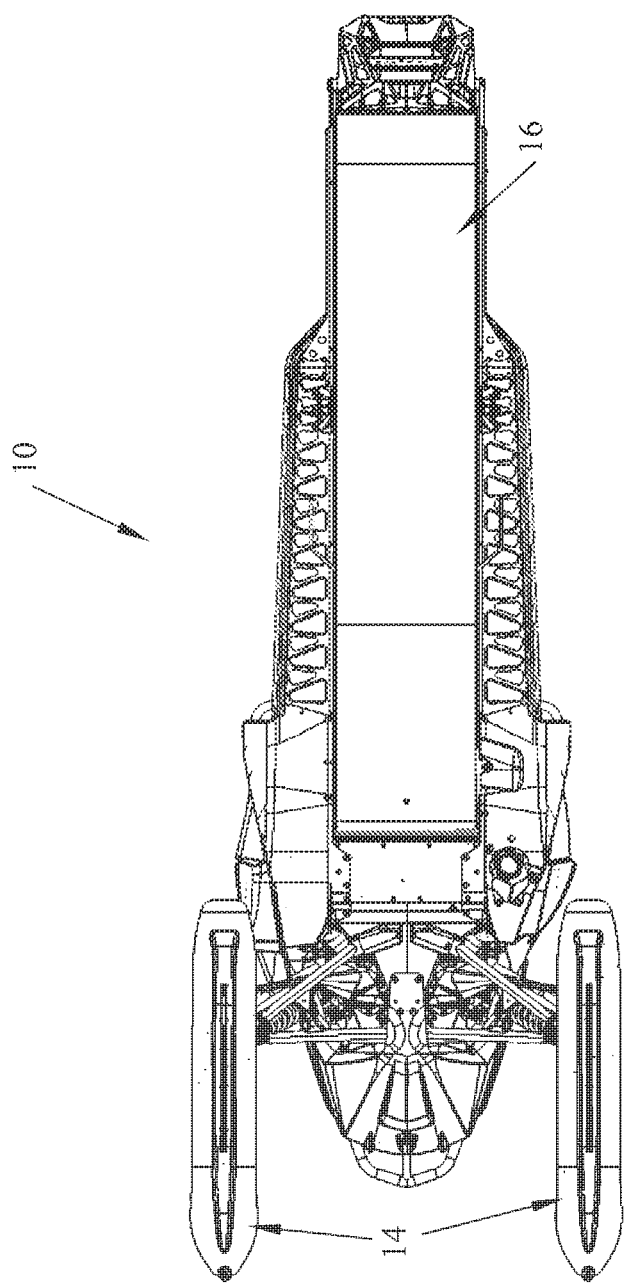
FIG. 8 is a bottom view of the embodiment shown in FIG. 1.

With reference to FIGS. 1 and 2, frame 12 includes a tunnel 40 having a top wall 42 and side walls 44. As shown best in FIG. 2, endless belt 16 at least partially runs up into tunnel 40 between side walls 44 and upwardly towards top wall 42. As shown, running board assemblies 32 include a rider's foot grip assembly 50 (FIG. 4) and a foot tread assembly 52, where the foot grip assembly 50 and foot tread assembly 52 are supported by the tunnel sidewall 44. As shown best in FIGS. 11 and 12, the tunnel 40 also include a plurality of cutout portions 46 which reduce the material in locations where fasteners are not needed. These cutouts 46 help to reduce the weight of the entire vehicle. The surface to which sidewalls 44 abut (not shown), also include notches but complement notches 46 such that the notches do not overlap. Other cutouts could be provided elsewhere as well.

Figure 9:
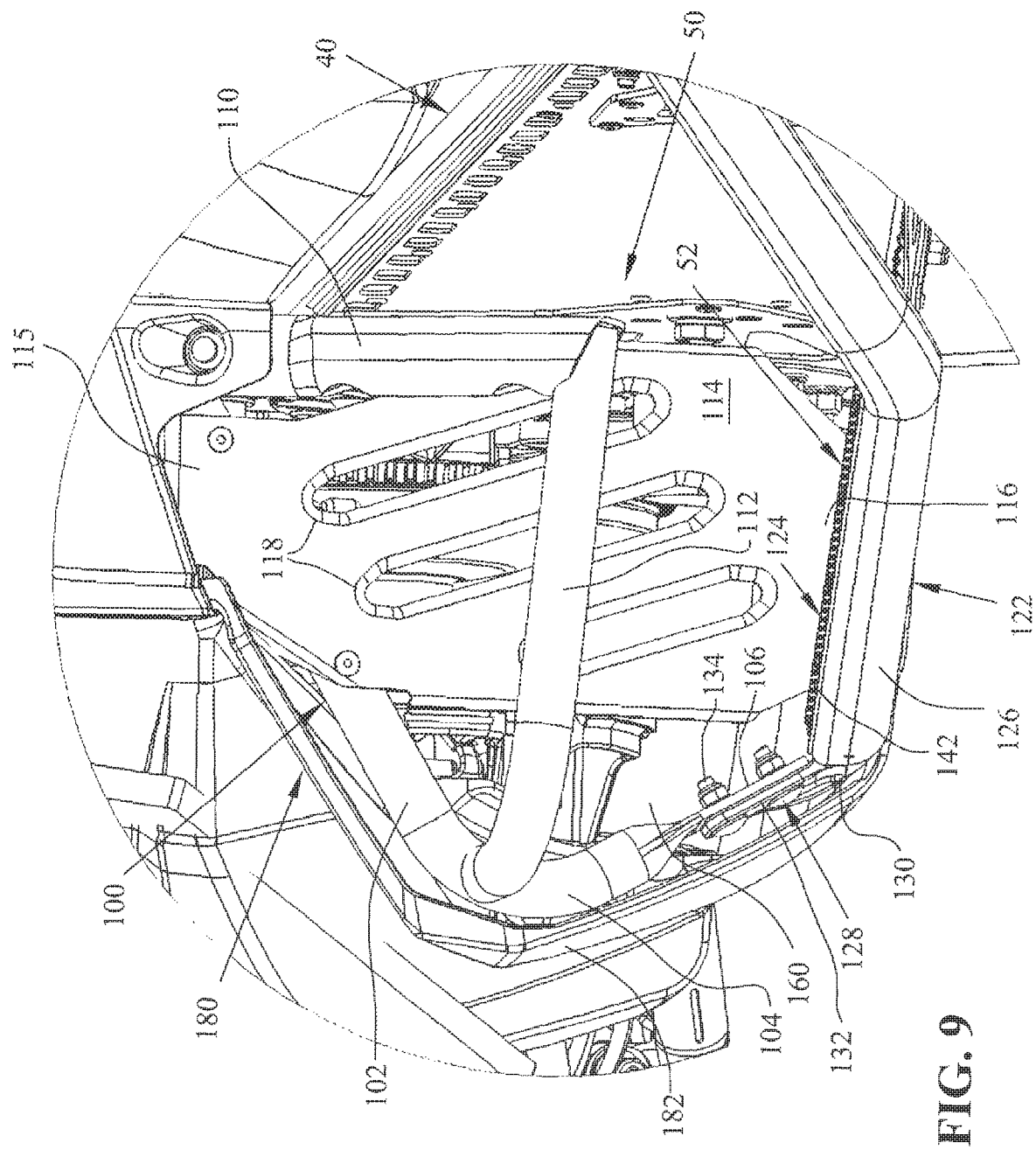
FIG. 9 is an enlarged view of a foot grip assembly of the embodiment shown in FIG. 1.

With reference now to FIG. 9, the foot grip assembly 50 is shown in greater detail. Foot grip assembly 50 includes frame member 100 which extends over the top wall 42 of tunnel 40 and has a first portion 102 extending downwardly and away from the tunnel 40, and a second portion 104 extending downwardly and is reversely bent towards the tunnel 40. The end of portion 104 is flattened and includes a flange at 106. Foot grip assembly 50 further includes a tube portion 110 which is fastened to the side of the tunnel 40 and connected to frame portion 100 for example, by welding. A toe clip 112 extends between frame member 110 and frame portion 102. Finally, foot grip assembly 50 includes a back wall 114 attached at marginal edges 115 and 116, and comprises plural slotted openings 118.

Figure 10:
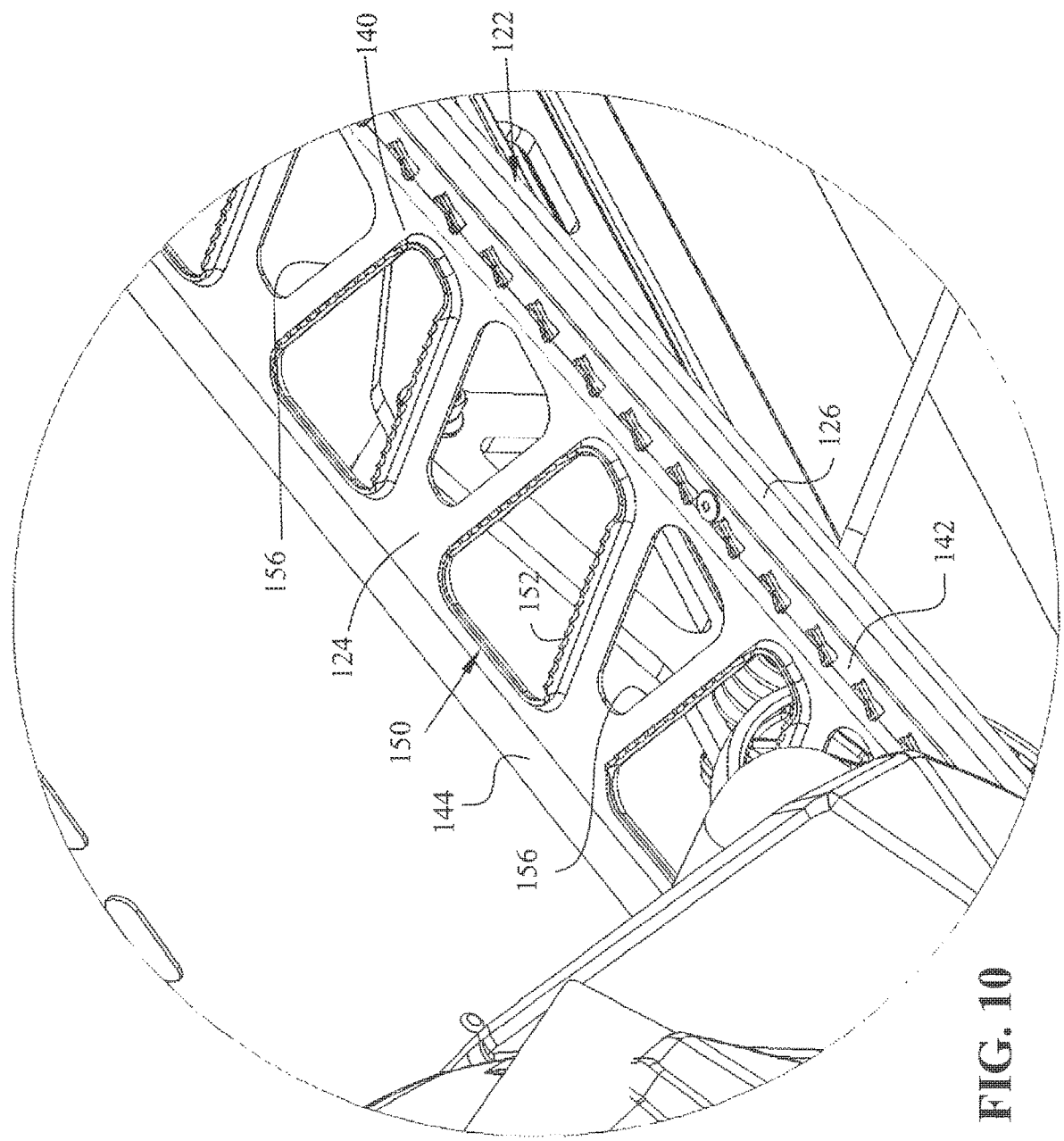
FIG. 10 is an enlarged view of a foot tread of the embodiment shown in FIG. 1.
Figure 11:
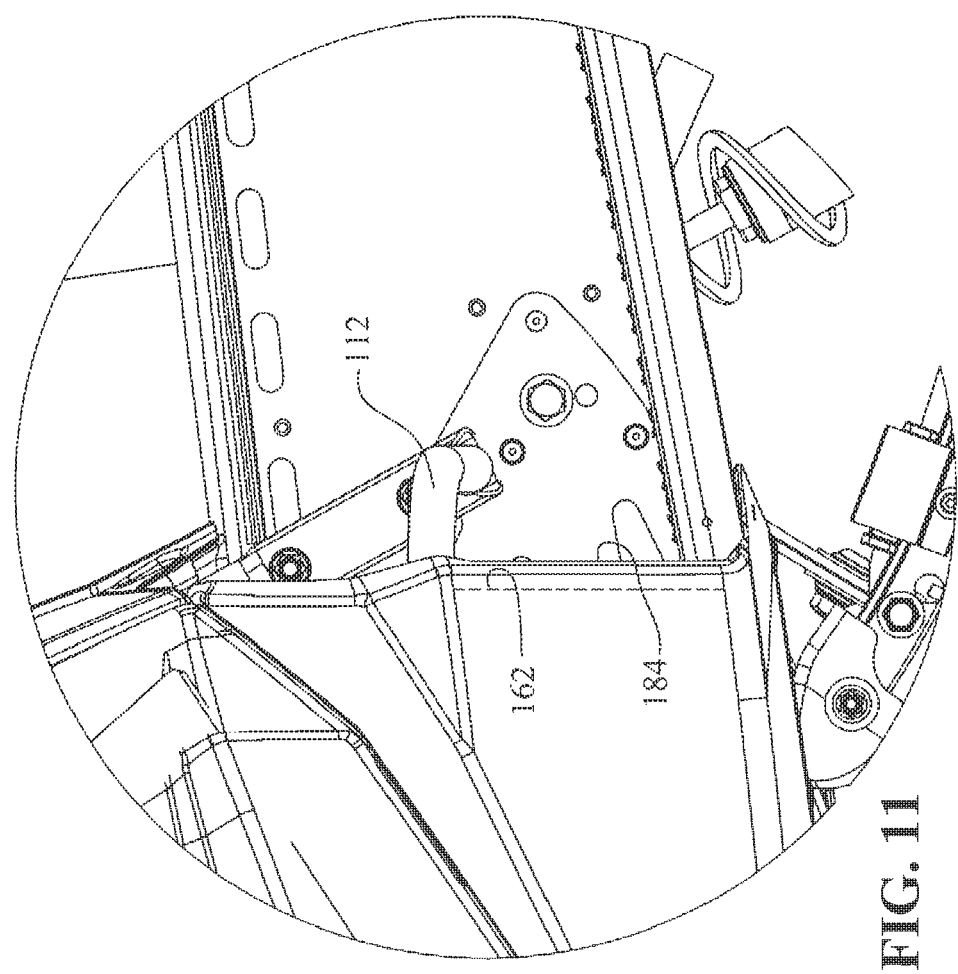
FIG. 11 is an enlarged side view of a front portion of the foot grip assembly of FIG. 9.
Figure 12:
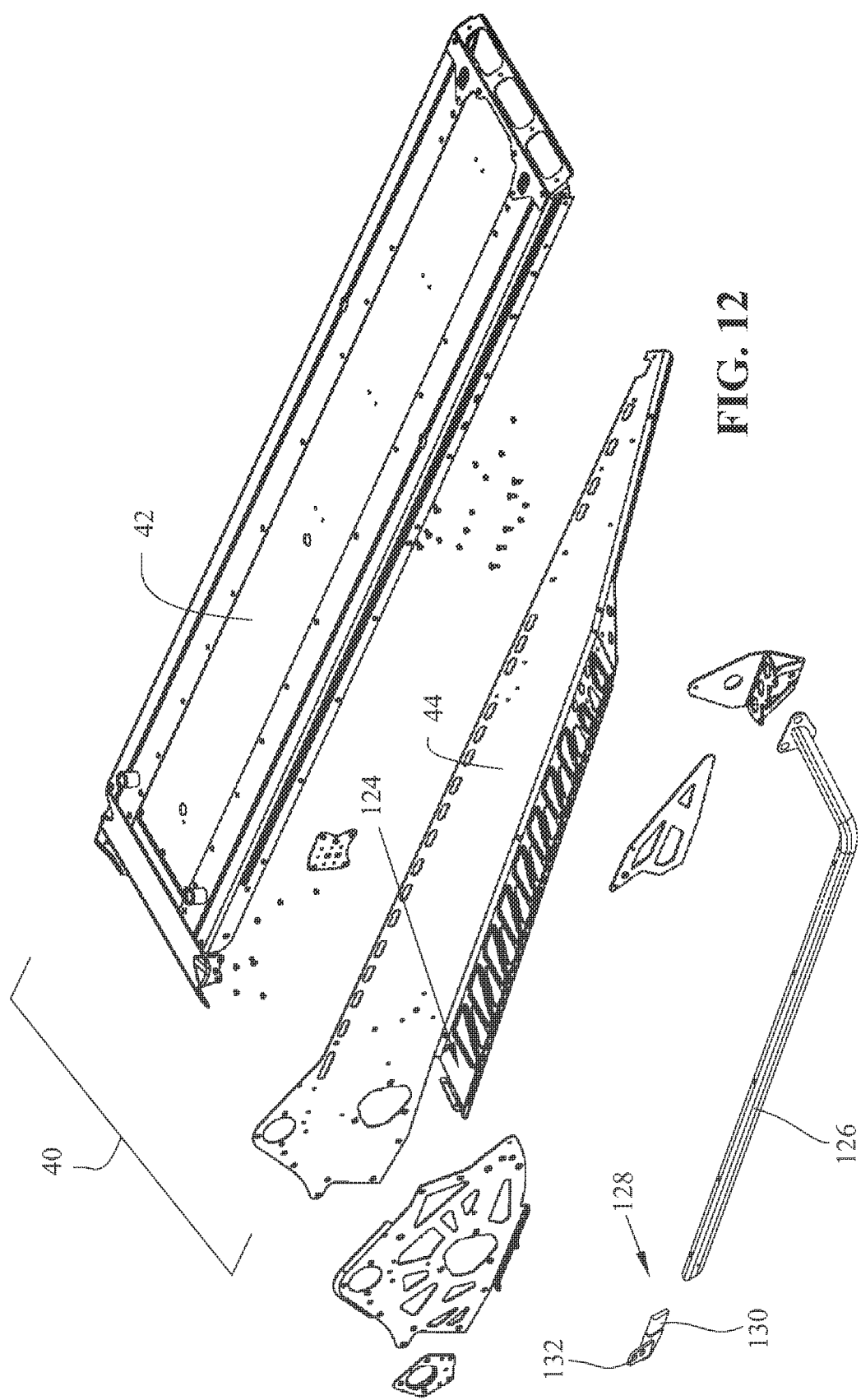
FIG. 12 is an exploded view of a tunnel of the snowmobile of FIG. 1.

With reference to FIGS. 9-12, foot tread assembly 52 is comprised of an elongate frame member 122 and running board plate 124. Elongate frame member 122 is comprised of a tube 126 and a frame bracket 128. As shown in FIG. 12, frame bracket 128 is discreet from tube 126. Bracket 128 includes a bracket foot 130 which extends into tube 126 and a bracket arm 132 for attachment to flange 106. Bracket foot 130 may be attached to tube 126 by way of fasteners, welding or adhesives, or a combination thereof. As shown in FIG. 9, the flattened surfaces of flanges 106 and bracket arms 132 are positioned back to back and attached by way of fasteners 134. Furthermore, the planes of the flat surfaces of flanges 106 and bracket member 132 extend in a longitudinal direction as described herein.

With respect now to FIGS. 9 and 10, running board plate 124 is comprised of a plate portion 140 having a lip 142 positioned and attached to elongate tube member 126 as shown. The opposite side of the plate portion 140 has a marginal edge 144 which is attached to the tunnel side wall 44. As shown in FIG. 12, the running board plate 124 is integral with the tunnel side wall 44, however this connection could also be by fastening, such as by welding, adhesives or riveting.

The running board plate 124 further includes a plurality of upturned embossments 150 (FIG. 10) having a generally triangular shape with gripping serrations 152 positioned thereon. Intermediate each of the upturned embossments 150 is an opening 156, of reverse triangular shape, where the embossments 150 rigidify the plate portion 140 whereas openings 156 maximize the open area of the foot tread to allow snow to drop downwardly therethrough. This provides a smooth bottom surface to plate portion 140, having no interference with the snow.

Thus, as shown in FIG. 9, an enlarged ventilation area is defined by the spacing at 160 and within the slots 118. The longitudinal disposition of the flanges 106 and 132 as described above also maximizes the ventilation area 160, particularly for the removal heat from the engine compartment as described herein.

Finally, with respect to FIGS. 9-11, an outer shroud 180 covers foot grip assembly 50 and includes a shroud portion 182 which encompasses portions 102 and 104 of frame tube 100. Shroud 180 also includes a rear edge 184 (FIG. 11) which is proximate to back wall 162. As shown best in FIG. 11, toe clip 112 extends rearwardly beyond rear edge 184 of shroud 180 which provides easy access for riders to place their boot in the toe clip 112, yet prevents forming a pocket into which snow may accumulate and pack. Also, the forward angle of edge 184 allows a rider's foot to position sideways, overlapping the foot tread assembly 52, and yet staying retained behind foot grip assembly 50.

Figure 13:
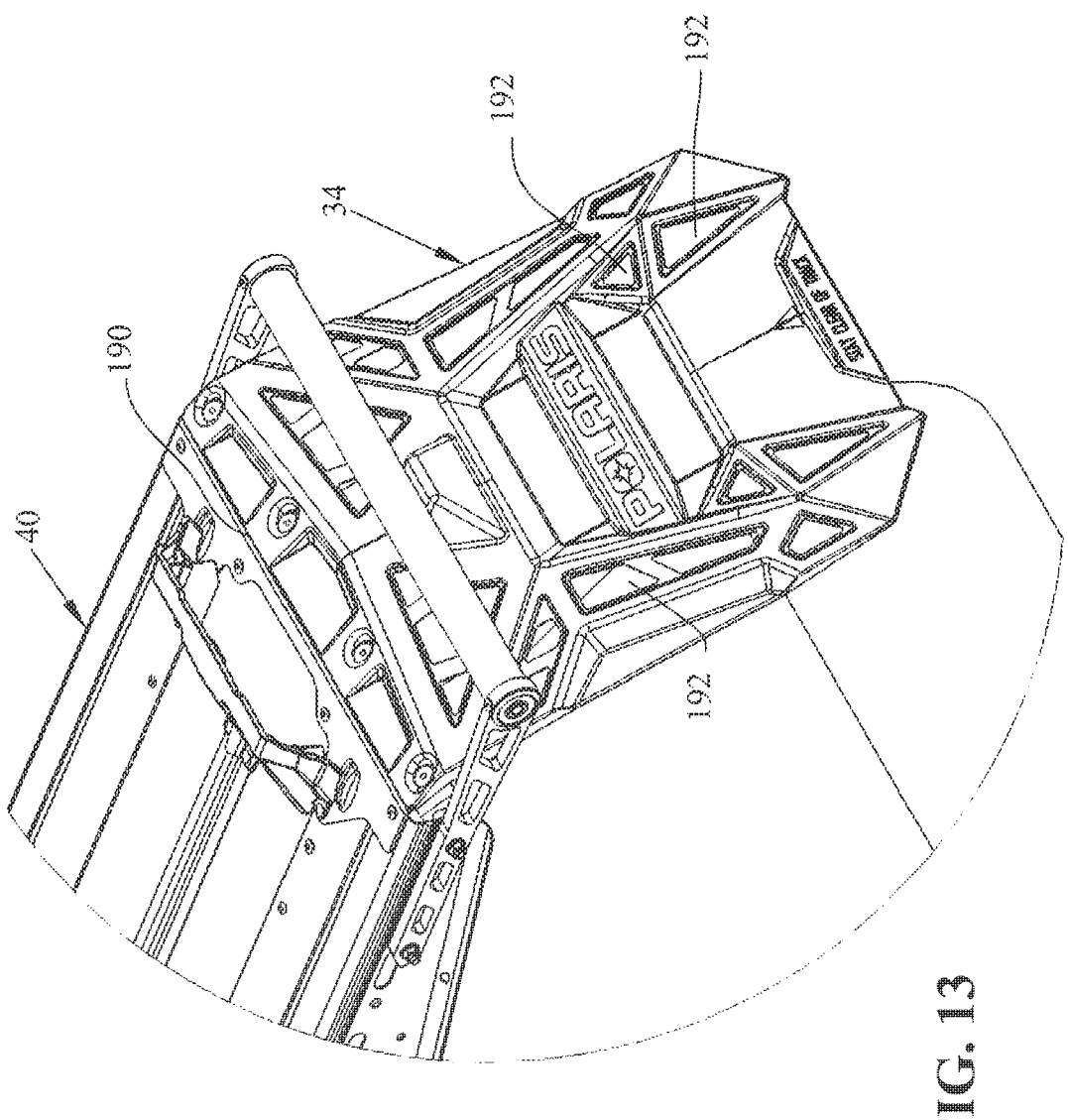
FIG. 13 is an enlarged view of a rear snow flap of the snowmobile of FIG. 1.

With reference now to FIG. 13, snow flap 34 is shown in an enlarged view. Snow flap 34 is hingedly mounted to the tunnel 40 along a rear edge 190. The snow flap 34 includes a plurality of apertures 192 which reduces the overall weight of the component. These could be machined or molded in.

Figure 14:
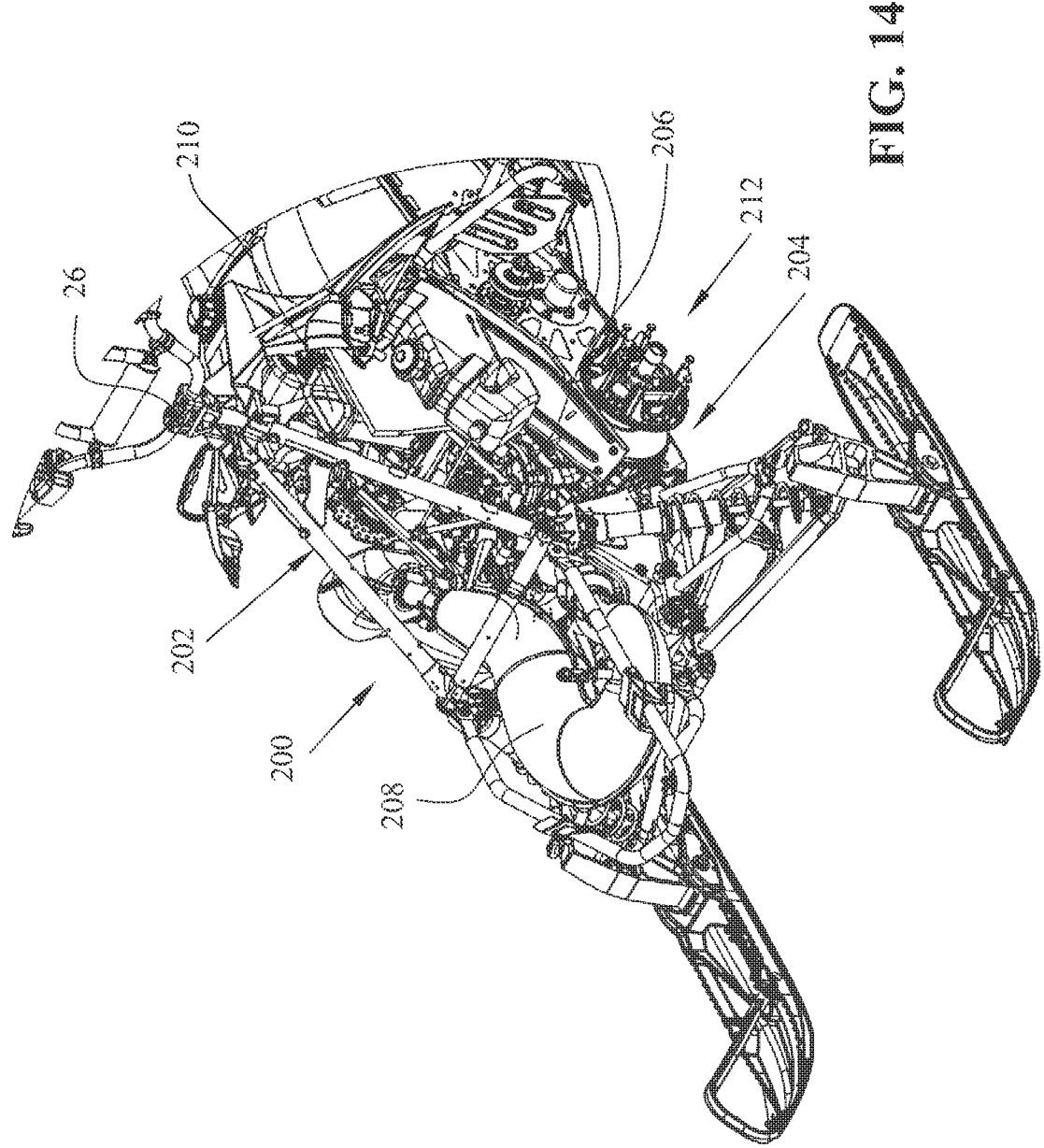
FIG. 14 is a partial front perspective view of the snowmobile with the front body removed.

With reference now to FIG. 14, the outer body 24 has been removed which better exposes an engine compartment 200, the steering assembly 26, a frame front portion 202, and a power train 204. The power train 204 includes an engine 206 having an exhaust system 208, an intake system 210 and a drive system including a CVT 212. As mentioned above, the ventilation area at 160 was defined around the foot grip area, and this allows the CVT ventilation to exhaust through the ventilation area at 160.

Figure 15:
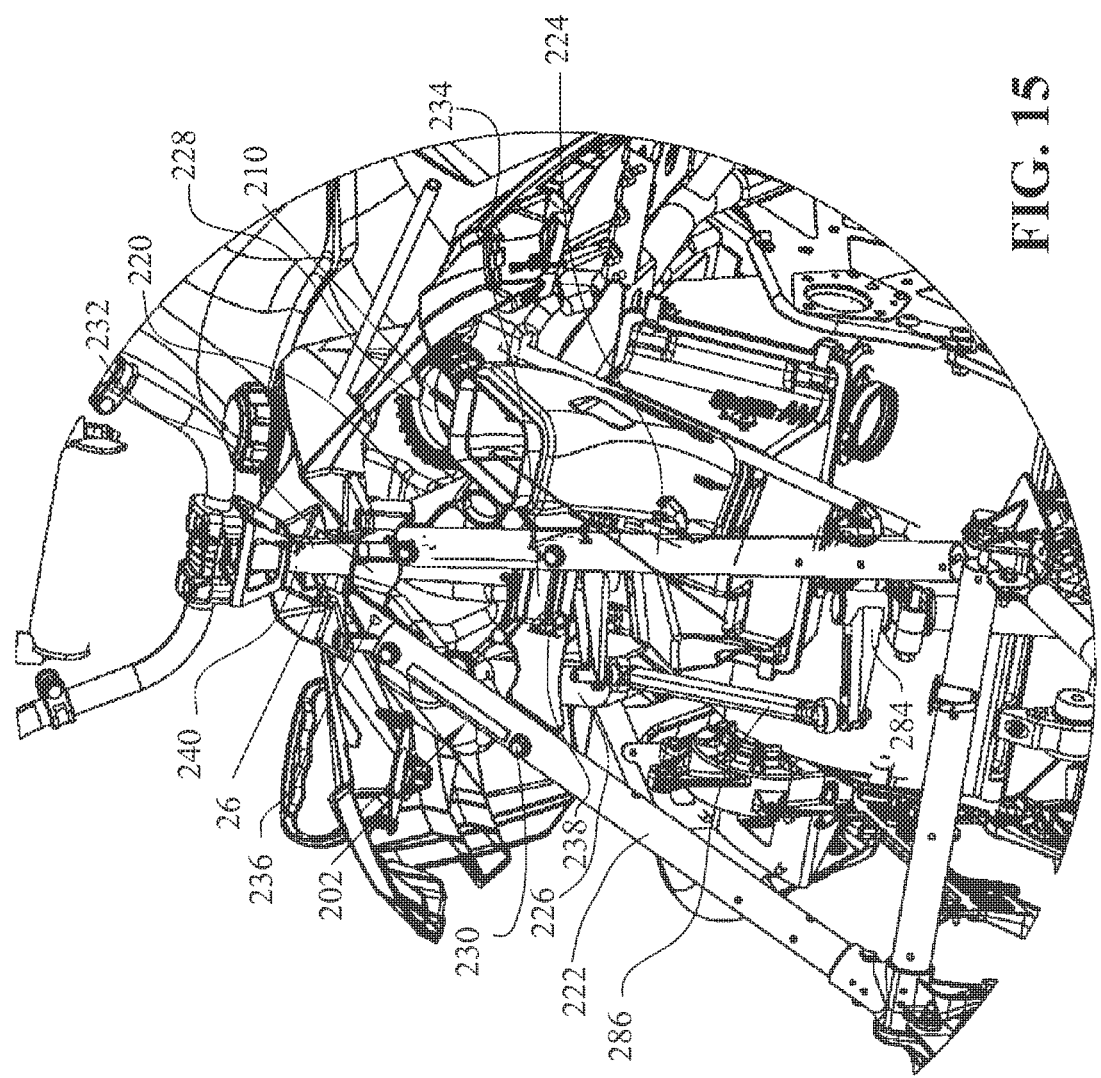
FIG. 15 is an enlarged front perspective of the front frame of the snowmobile of FIG. 14.

With reference now to FIG. 15, the front frame portion 202 is shown in greater detail. Front frame portion 202 includes a cast coupling or connector 220 configured to attach plural frame tubes, namely front frame tubes 222, 224 and rear frame tubes 226, 228 thereto. The frame tubes 222, 224, 226, 228 may be attached to the cast coupling 220 by way of fasteners, such as fasteners 230, and/or may be adhesively fixed to the cast coupling 220. As shown, the cast coupling 220 further includes two support webs 232 and 234. Each of the webs 232, 234 is provided with threaded apertures, for example apertures 236 and 238. As also shown in FIG. 15, a steering post 260 of steering assembly 26 is directly coupled to webs 232 and 234 of the cast coupling 220, as described herein.

Figure 18:
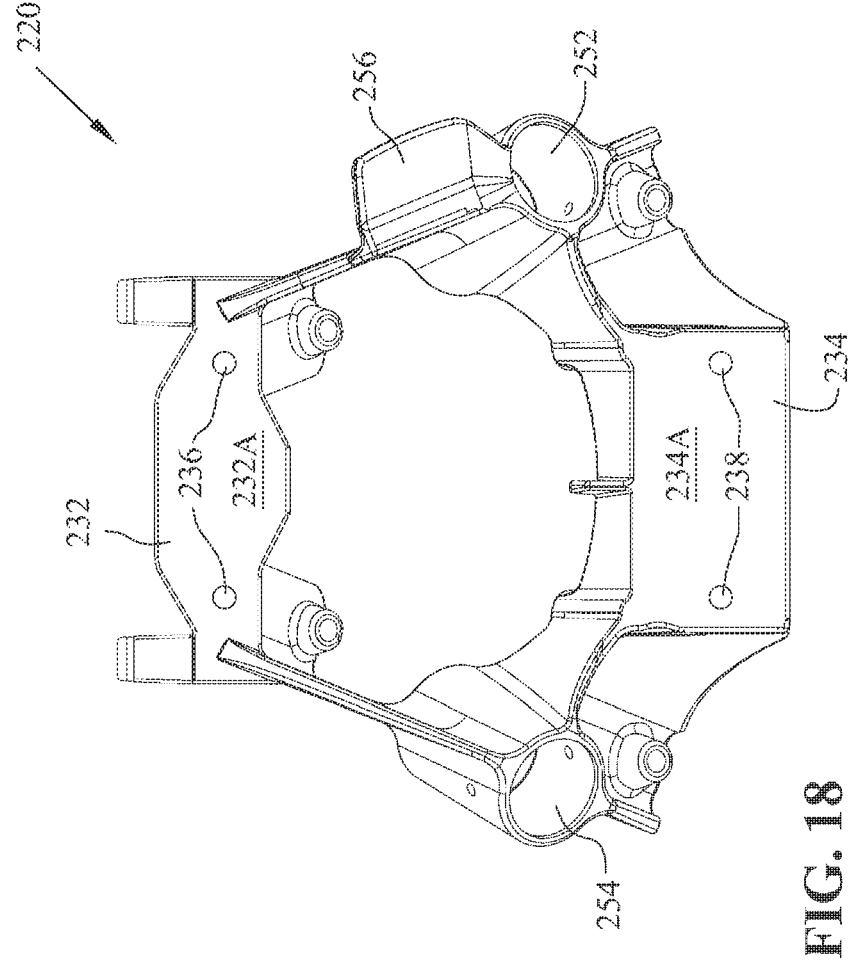
FIG. 18 is a rear view of the cast frame member of the snowmobile of FIG. 16.

With reference now to FIGS. 16-18, cast coupling 220 will be described in greater detail. Cast coupling 220 further includes a first circular channel (FIG. 16) defined by portions 240 and 242 having threaded bosses 244 extending downwardly therethrough. A second circular channel is defined by portions 246 and 248 having threaded bosses 250 therein. The circular channels are intersected by cylindrical members 252 and 254. Thus, with a comparison of FIGS. 15 and 16, it should be appreciated that frame tubes 222 and 224 are positioned across the circular channels with fasteners, such as fasteners 230, positioned through the frame tubes 222, 224 and into the threaded bosses 244, 250. Adhesive may also be applied. Meanwhile, frame tubes 226 and 228 are positioned in the cylindrical members 252 and 254, and may also be fixed in place by way of fasteners and adhesive.

With reference now to FIG. 18, cast coupling 220 includes machined mounting surfaces 232A and 234A on the backside of the webs 232 and 234, respectively, for mounting the steering post 260, as described below. Finally, as best shown in FIG. 17, cast coupling 220 includes an integral fuel tank mounting tab shown at 256.

Figure 19:
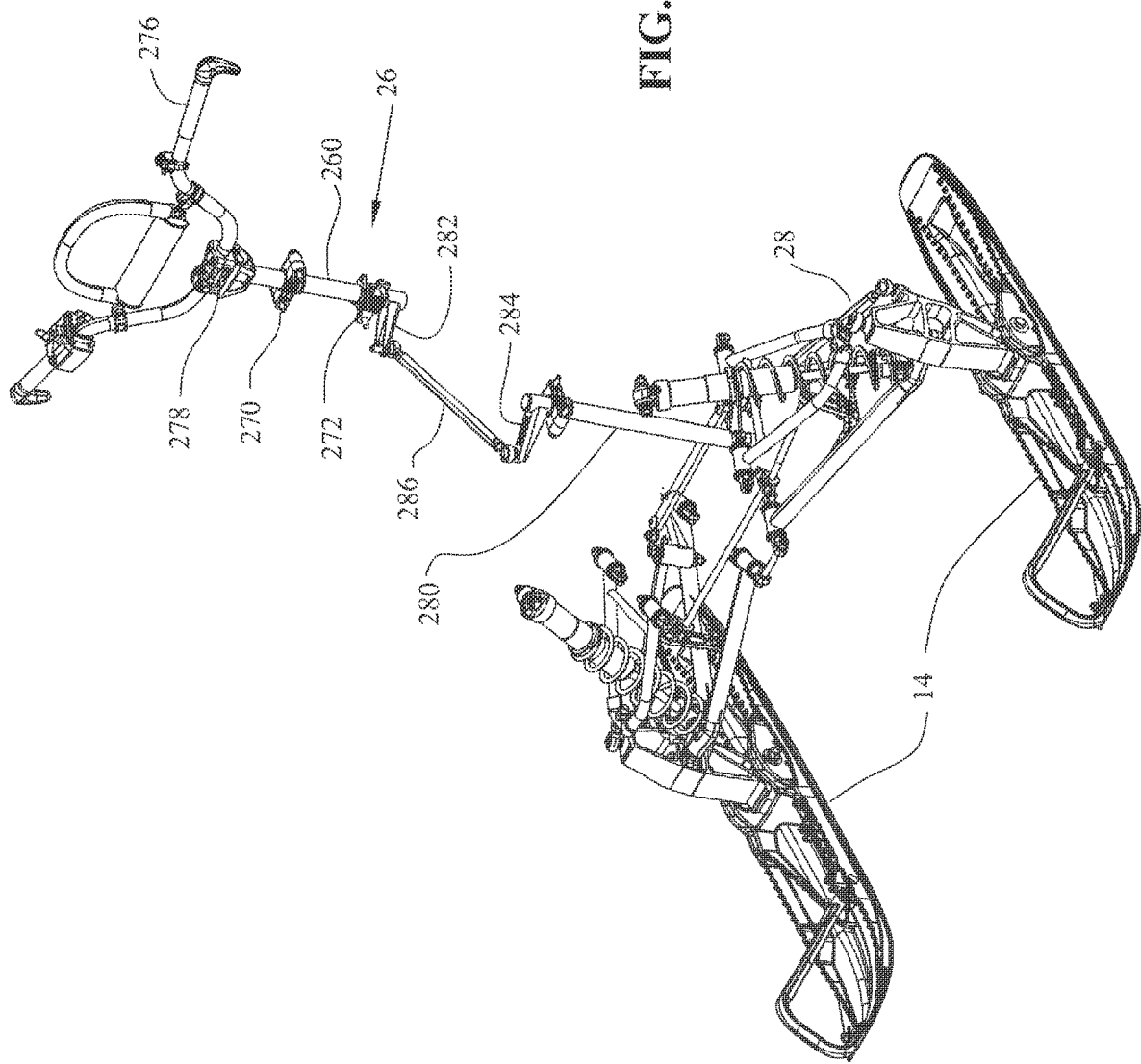
FIG. 19 is a front perspective view of a steering assembly of the snowmobile of FIG. 1.

With reference now to FIG. 19, the steering assembly 26 is shown in greater detail. As shown, steering post 260 includes an upper and lower bearing posts 270 and 272 which attach to the backside of the webs 232, 234 respectively, with fasteners being attached to threaded apertures 236 and 238, respectively. This rigidly connects the steering post 260 to the cast coupling 220 yet allows the steering post 260 to pivot about the corresponding bushings 270 and 272. As also shown, handlebars 276 of steering assembly 26 are attached to the steering post 260 by way of a clamp at 278.

Steering assembly 26 further comprises a lower steering post 280 which is operatively coupled to steering post 260 by way of respective link arms 282, 284, connected together by way of a link 286. Lower steering post 280 is ultimately connected to steering arms 28 by way of a further steering arm, not shown, to maneuver the steering skis 14.

Figure 20:
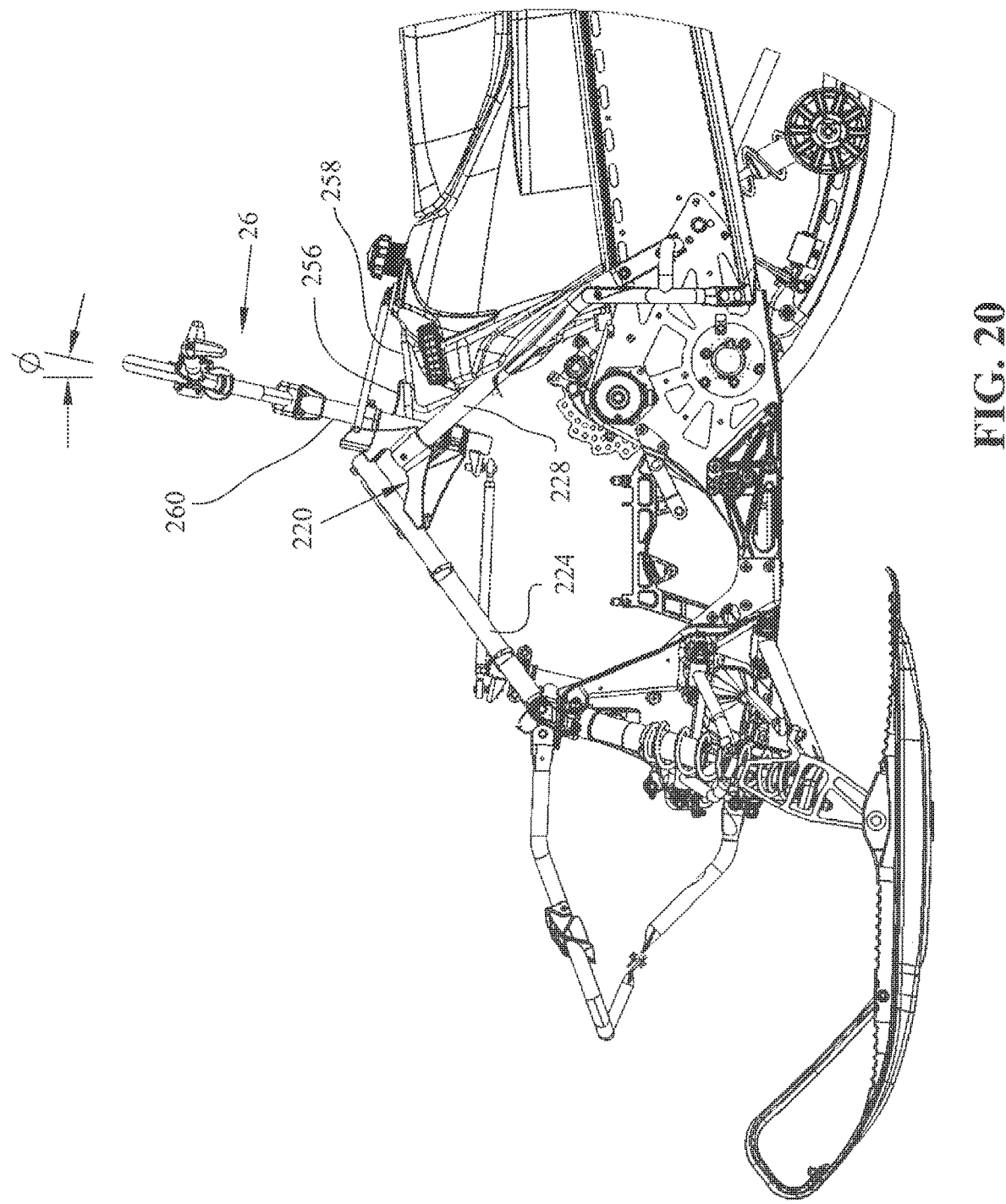
FIG. 20 is a side view of the steering assembly mounted to the cast frame member of FIG. 16.

With reference now to FIG. 20, steering assembly 26 is shown mounted to the backside of cast coupling 220 with the bushings 270, 272 (FIG. 19) mounted to the surfaces 232A, 234A (FIG. 18), respectively. As shown, steering post 260 is nearly vertical and could be in the range where angle Ø could be between 0 and 15 degrees and as shown is about 13 degrees. As steering post 260 is positioned at a substantially upright angle, the ergonomics is improved for the deep snow rider.

As known, when side hilling, a rider is often standing on only one side of the running board assemblies 32 and the maneuverability of the steering post 260 and handlebars 276 is substantially increased when the steering post 260 is close to vertical. This prevents the handlebars 276 from dipping down or raising up on either side when attempting to steer the snowmobile 10 while standing on only one side.

FIG. 20 also shows a fuel tank 258 having a front end positioned adjacent to the integral fuel tank mounting tab 256 to retain a front end of the fuel tank 258. Fuel tank 258 may be attached to tab 256 through fasteners, or fuel tank could have a molded slot to be applied over tab 256.

Figure 21:
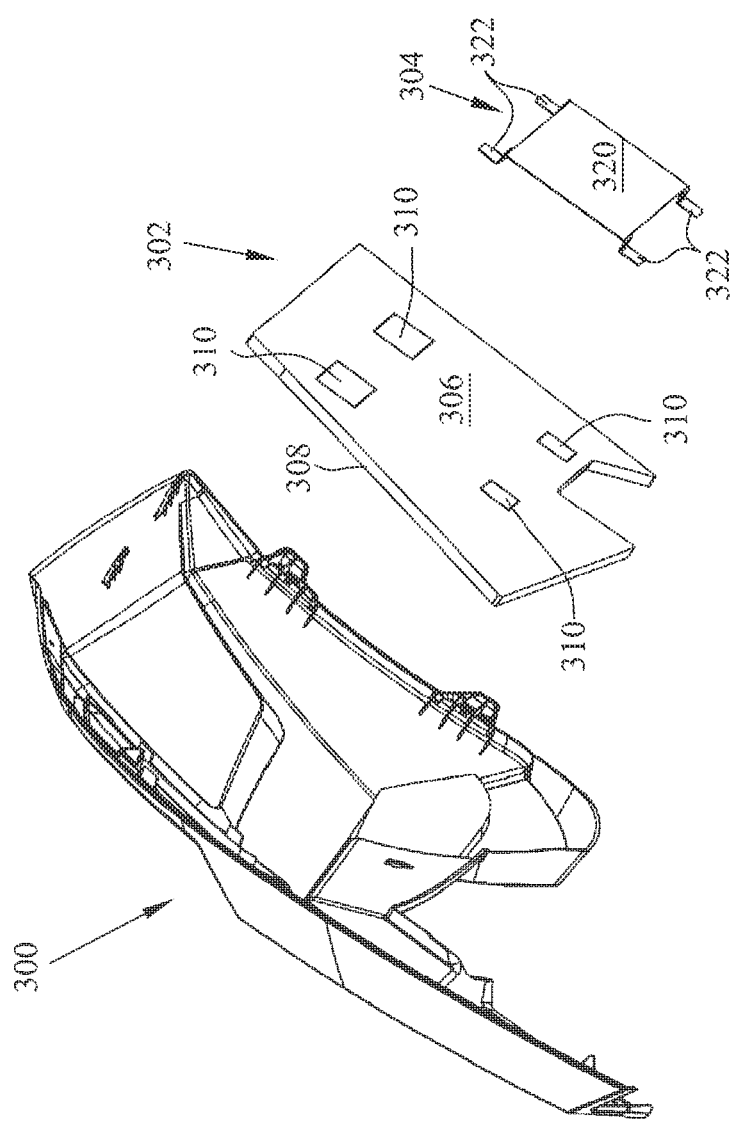
FIG. 21 is a side perspective view of a heat shield member mounted to an inside of the body panel of the snowmobile of FIG. 1.

With respect now to FIG. 21, front side panel 300 (see also FIG. 4) on the right hand side of the snowmobile 10 is provided with sound insulation, such as a foam 302, as well as a heat shield 304. The foam includes a front surface 306, a back surface 308, and a plurality of cutouts 310 extending between the front and back surface 306 and 308. Heat shield 304 includes a plate 320 having a plurality of mounting feet 322 which correspond in location to the apertures 310. An adhesive is provided against the back surface 308 to retain sound insulation to the inside surface of the panel 300. Heat shield 304 can be placed with the mounting feet 322 aligned with the associated apertures 310 and pressed against the foam 302 until the mounting feet 322 contact the adhesive, through the apertures 310, which retains the heat shield 304 to the foam 302. This prevents any fasteners or additional dimensional requirements for attaching the heat shield 304 to the foam 302. This also provides less weight for the snowmobile yet provides a heat shield 304 adjacent to a portion of the exhaust system of the snowmobile power train 204, as described above. The adhesive could be a double-sided sticky tape, double sided foam tape, or any other adhesive for the purposed described.

Figure 22:
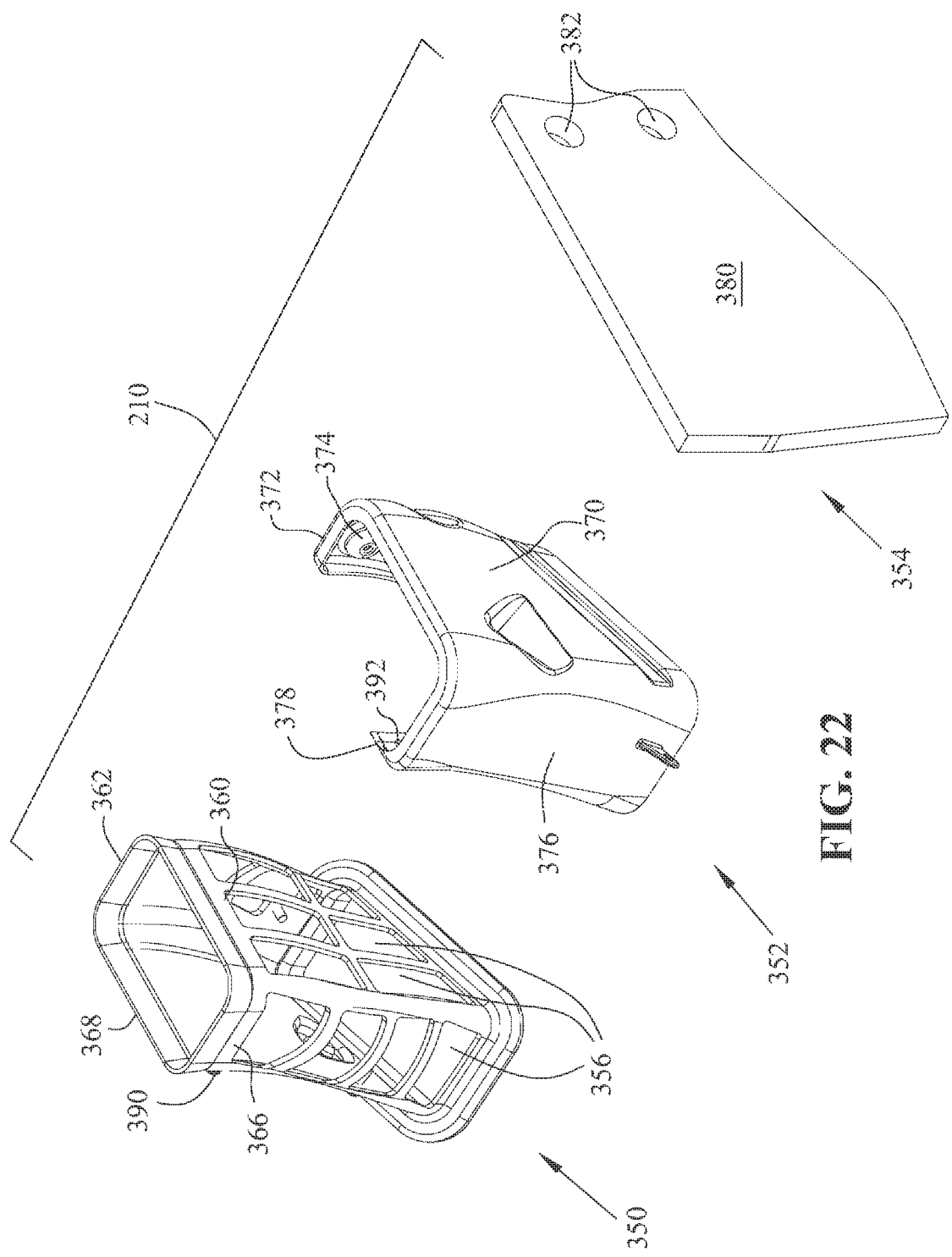
FIG. 22 is an exploded perspective view of an air intake system of the snowmobile of FIG. 1.

Referring now to FIG. 22, air inlet 210 (FIG. 15) is shown in greater detail and comprised of inlet housing 350, retainer housing 352 and sound-deadening foam 354. Housing 350 is generally rectangular having a plurality of apertures 356 extending therethrough, where the rectangular housing has a front wall 360, a sidewall 362 opposite a side wall 366, and rear wall 368. Retainer housing 352 includes a front wall 370, a sidewall 372 having lugs 374, an opposite sidewall 376, and a partial rear wall 378. Sound-deadening foam 354 generally includes a foam body portion 380 having locating apertures at 382.

It should be appreciated that the foam 354 is positioned on an inside of the retainer housing 352 with lugs 374 aligned with apertures 382 of the foam 354. The retainer housing 352 and foam 302 together are then snapped around inlet housing 350 with the front wall 370 of retainer housing 352 positioned against front wall 360 of inlet housing 350, sidewalls 372 and 376 positioned adjacent to corresponding sidewalls 362 and 366, respectively, and with partial wall 378 at retainer housing 352 positioned against back wall 368. The retainer housing 352 and inlet housing 350 can be held together by way of corresponding latch members such as a lug 390 and aperture 392, to retain the two components together. This provides an easy to assemble two-component intake system 210 having internal housing 350 and retainer housing 352, whereby air traveling through the intake system 210 can be sound-deadened by foam member 354.

Figure 23:
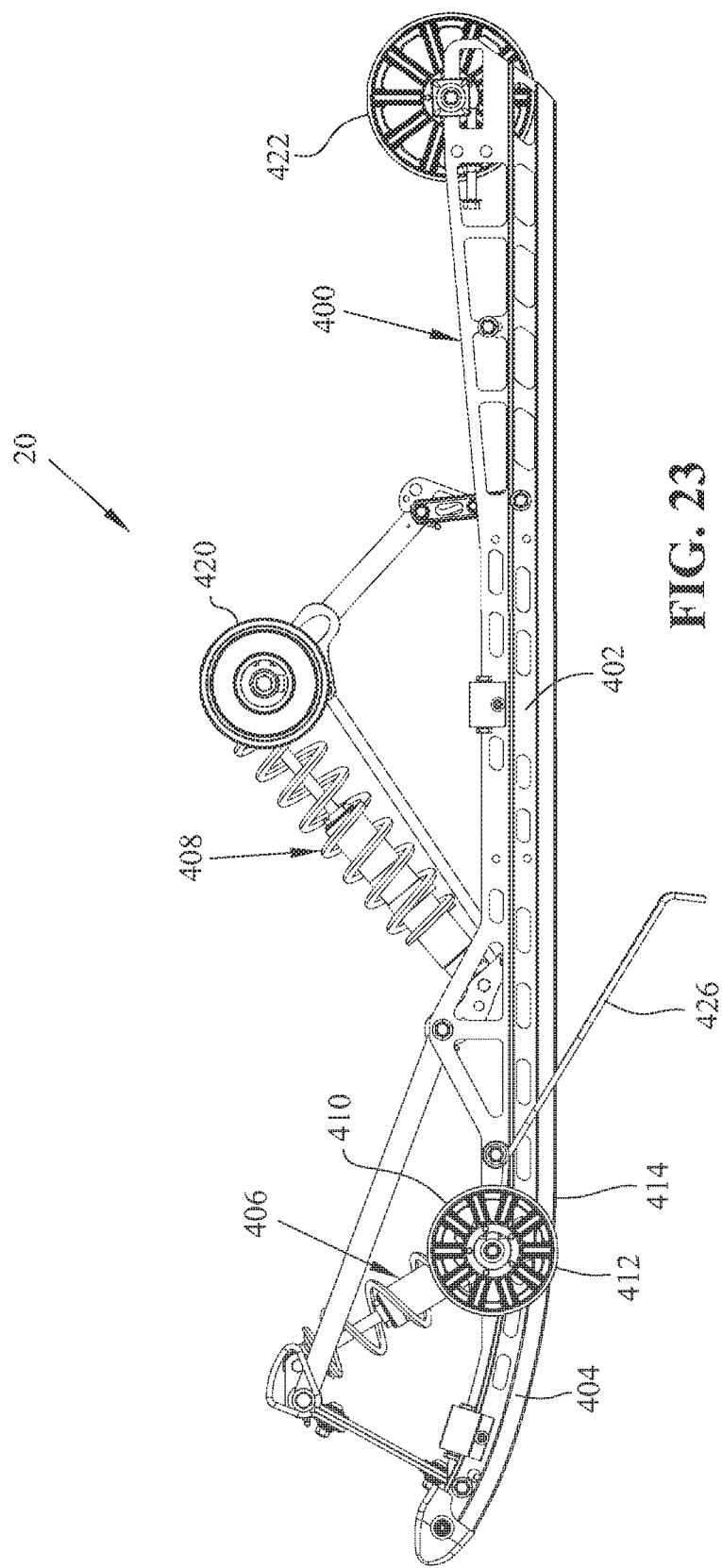
FIG. 23 is a side showing a suspension system removed from the tunnel of the snowmobile of FIG. 12.

With reference now to FIG. 23, rear suspension 20 is shown removed from the tunnel 40, understanding that the rear suspension 20 is attached to the underside of tunnel 40. Suspension 20 includes a frame 400 having laterally spaced frame rails 402 with slide rails 404 attached thereto. Suspension 20 includes two coil over shocks 406 and 408 providing dampening between the tunnel 40 and frame 400. A track roller 410 is mounted on the outside of the slide rail 402, and as shown, has an outer radial surface 412 which extends beyond lower surface 414 of slider 404. Track rollers 410 are located at a position proximate a maximum pressure point between the sliders 404 and the track (absent the track wheel) which allows the track a slight spacing between the sliders 404, preventing substantial frictional heating. Suspension 20 also includes idler rollers 420 and 422. Scratchers 426 are also provided on the side of frame 404 to break up crusted snow in order that the track can throw snow against the underside of tunnel 40, as the tunnel 40 includes a heat exchanger for engine water.

With reference now to FIGS. 13 and 24, a rear bumper assembly 450 is shown including a rear bumper member 452 and side brackets 454. Bumper member 452 is comprised of a carbon fiber material and, as best shown in FIG. 24, has an outer diameter 456, an inner diameter 458, and apertures 460. Side brackets 454 are comprised of an extruded aluminum and include apertures 462 for mounting the side brackets to tunnel 40 by way of fasteners 464 (FIG. 13). As shown, extruded brackets 454 have extruded openings at 466 and apertures 468 which extend into openings 466. A cap 470 is also provided having a lip 472 and a reduced diameter portion 474 with apertures 476.

To assemble bumper assembly 450, bumper member 452 is positioned in openings 466 of extruded members 454. Caps 470 are positioned with diameter portions 474 within inner diameter 458 and with the lips 472 against the extruded side bracket 454, with apertures 460 and 476 aligned. Fasteners 480 are then placed through the extruded members 454, bumper member 452 and cap 470 to retain the bumper member 452 thereto. Fasteners 464 could be set screws, bolts, rivets or any similar fastening device, although as shown, fasteners 480 are rivets. As also shown in FIG. 13, snow flap 34 includes a stop member 490 integrally molded with the flap which has an upper stop surface 492 abutting against the bumper member 452.

It should be generally understood that the description provided herein relates only to the specific embodiment, and that other variations could be envisions. For example, while referring herein to tubes, cylindrical tubes are shown, but it is contemplated that other structural geometries, such rectangular or square tubes could also be used.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snowmobile, comprising:
   a frame;
   a power train supported by the frame,
   an exhaust system;
   a heat shield positioned adjacent to a portion of the exhaust system; and
   insulation having a back surface engaging an inner surface of a side panel of the snowmobile and a front surface proximate the heat shield such that the heat shield is intermediate the insulation and the portion of the exhaust system.

2. The snowmobile of claim 1, wherein the side panel is a front side panel.

3. The snowmobile of claim 1, wherein adhesive is applied to at least one of the back surface of the insulation and the inner surface of the side panel.

4. The snowmobile of claim 1, wherein the heat shield includes a plurality of mounting feet and the insulation includes a plurality of apertures, the plurality of mounting feet engaging with the plurality of apertures to couple the heat shield and the insulation.

5. The snowmobile of claim 4, wherein the plurality of apertures extend through the front surface of the insulation and the back surface of the insulation.

6. The snowmobile of claim 4, wherein each of the plurality of mounting feet extends through the plurality of apertures and contacts an adhesive applied to the inner surface of the side panel of the snowmobile.

7. The snowmobile of claim 4, wherein the plurality of mounting feet includes a first pair of mounting feet adjacent a first end of the heat shield and a second pair of mounting feet adjacent a second, opposite end of the heat shield.

8. A snowmobile, comprising:
   a frame;
   a power train supported by the frame,
   an exhaust system;
   a heat shield positioned adjacent to a portion of the exhaust system; and
   insulation proximate the heat shield such that the heat shield is intermediate the insulation and the portion of the exhaust system;
   wherein the insulation is intermediate the heat shield and an inner surface of a side panel of the snowmobile; and
   wherein adhesive is applied to at least one of the insulation and the inner surface of the side panel, the adhesive being intermediate the insulation and the inner surface of the side panel.

9. The snowmobile of claim 8, wherein the insulation is foam.

10. The snowmobile of claim 8, wherein the side panel is a front side panel.

11. The snowmobile of claim 8, wherein the heat shield includes a plurality of mounting feet and the insulation includes a plurality of apertures, the plurality of mounting feet engaging with the plurality of apertures to couple the heat shield and the insulation.

12. The snowmobile of claim 11, wherein the plurality of apertures extend through a front surface of the insulation and a back surface of the insulation.

13. The snowmobile of claim 11, wherein each of the plurality of mounting feet extends through the plurality of apertures and contacts an adhesive applied to the inner surface of the side panel of the snowmobile.

14. The snowmobile of claim 11, wherein the plurality of mounting feet includes a first pair of mounting feet adjacent a first end of the heat shield and a second pair of mounting feet adjacent a second, opposite end of the heat shield.

15. A snowmobile, comprising:
   a frame;
   a power train supported by the frame,
   an exhaust system;
   a heat shield positioned adjacent to a portion of the exhaust system; and
   insulation proximate the heat shield such that the heat shield is intermediate the insulation and the portion of the exhaust system;
   wherein the heat shield includes a plurality of mounting feet and the insulation includes a plurality of apertures, the plurality of mounting feet engaging with the plurality of apertures to couple the heat shield and the insulation.

16. The snowmobile of claim 15, wherein the plurality of apertures extend through a front surface of the insulation and a back surface of the insulation.

17. The snowmobile of claim 15, wherein each of the plurality of mounting feet extends through the plurality of apertures and contacts an adhesive applied to an inner surface of a side panel of the snowmobile.

18. The snowmobile of claim 15, wherein the plurality of mounting feet includes a first pair of mounting feet adjacent a first end of the heat shield and a second pair of mounting feet adjacent a second, opposite end of the heat shield.

19. The snowmobile of claim 15, wherein the power train further comprises an air intake system, the air intake system including at least one air inlet having a housing and a foam body to reduce noise outputted by the air intake system, wherein the housing includes a plurality of apertures adjacent to the foam body.

20. The snowmobile of claim 19, wherein the air inlet further includes a retainer coupled to the housing, the foam body being intermediate the housing and the retainer.

21. The snowmobile of claim 20, wherein the retainer includes at least one lug and the foam body includes at least one aperture aligned with the at least one lug to locate the foam body relative to the retainer.

22. The snowmobile of claim 21, wherein the at least one lug is located on a side wall of the retainer and the at least one aperture is located adjacent an end of the foam body that is configured to couple with the side wall of the retainer.

23. The snowmobile of claim 20, wherein the foam body is configured to couple with the retainer such that a first portion of the foam body engages a side wall of the retainer and a second portion of the foam body engages a front wall of the retainer.

24. The snowmobile of claim 20, wherein the housing includes at least one lug and the retainer includes at least one aperture corresponding to the at least one lug to couple the retainer to the housing.

25. The snowmobile of claim 24, wherein the at least one lug is located on a rear wall of the housing and the at least one aperture is located on a partial rear wall of the retainer.

26. The snowmobile of claim 20, wherein the housing has a generally rectangular shape including a front wall, opposing side walls, and a rear wall, and the retainer has a generally rectangular shape including a front wall, opposing side walls, and a partial rear wall, the front wall of the housing configured to couple with the front wall of the retainer, the opposing side walls of the housing configured to couple with the opposing side walls of the retainer, and the rear wall of the housing configured to couple with the partial rear wall of the retainer.

27. The snowmobile of claim 26, wherein the foam body is disposed between the front wall of the housing and the front wall of the retainer when the retainer is coupled with the housing.

* * * * *